US012336961B2

(12) United States Patent
Humbertjean et al.

(10) Patent No.: US 12,336,961 B2
(45) Date of Patent: Jun. 24, 2025

(54) GLASS CONTAINERS FOR PACKAGING SALT OR SUGAR-CONTAINING COMPOSITIONS IN A FROZEN STATE

(71) Applicant: SCHOTT Pharma AG & Co. KGaA, Mainz (DE)

(72) Inventors: Alexander Humbertjean, Bad Krozingen (DE); Tobias Wetzel, Sölden (DE); Hanspeter Kummer, Müllheim (DE); Fatih Mutlu, Neuenburg (DE)

(73) Assignee: SCHOTT Pharma AG & Co. KGaA, Mainz (DE)

( * ) Notice: Subject to any disclaimer, the term of this patent is extended or adjusted under 35 U.S.C. 154(b) by 19 days.

(21) Appl. No.: 18/348,450

(22) Filed: Jul. 7, 2023

(65) Prior Publication Data

US 2024/0009078 A1 Jan. 11, 2024

(30) Foreign Application Priority Data

Jul. 8, 2022 (EP) .................................... 22183917

(51) Int. Cl.
*A61J 1/14* (2023.01)
*A61J 1/06* (2006.01)

(52) U.S. Cl.
CPC ................. *A61J 1/14* (2013.01); *A61J 1/065* (2013.01)

(58) Field of Classification Search
CPC ........... A61J 1/14; A61J 1/065; B65D 1/0261; B65D 1/09; B65D 1/0276
See application file for complete search history.

(56) References Cited

U.S. PATENT DOCUMENTS 4,420,578 A 12/1983 Hagens et al.
11,376,191 B2 * 7/2022 Langsdorf ............ C03B 23/099
(Continued)

FOREIGN PATENT DOCUMENTS

EP 1 593 658 A1 11/2005
EP 3590896 A1 * 8/2020
WO 2014/105350 A2 7/2014

OTHER PUBLICATIONS

"Guidelines on types of glass of normal bulk-production composition and their test methods", ISO 12775, Oct. 15, 1997 (14 pages).
(Continued)

*Primary Examiner* — Don M Anderson
(74) *Attorney, Agent, or Firm* — TAYLOR & EDELSTEIN, PC

(57) ABSTRACT

A glass container is characterized by a longitudinal axis ($L_{tube}$) that passes through a center of a glass bottom of the glass container. For any cut surface of the glass container that is obtainable by cutting the glass container in a plane that includes the longitudinal axis $L_{tube}$, a minimum thickness ($s_{min}$) and a maximum thickness ($s_{max}$) of the glass bottom determined at any position having a distance $d_1/4$ or less to the longitudinal axis $L_{tube}$ and a thickness ($s_{d1/4}$) is the thickness of the glass bottom determined at a position having the distance $d_1/4$ to the longitudinal axis $L_{tube}$, the distance to the longitudinal axis $L_{tube}$ in each case being determined in a direction that is perpendicular to the longitudinal axis $L_{tube}$ and thicknesses $s_{min}$, $s_{max}$ and $s_{d1/4}$ being determined in a direction that is parallel to longitudinal axis $L_{tube}$, with $s_{max}/s_{min}$ being less than 1.8.

20 Claims, 13 Drawing Sheets

(56) References Cited

U.S. PATENT DOCUMENTS

| | | | | |
|---|---|---|---|---|
| 2004/0025538 | A1 | 2/2004 | Kunert et al. | |
| 2011/0006028 | A1 | 1/2011 | Caldwell | |
| 2013/0171456 | A1* | 7/2013 | Fadeev | B65D 23/0821 428/429 |
| 2018/0265243 | A1* | 9/2018 | Gutekunst | B65D 1/0215 |
| 2019/0350806 | A1* | 11/2019 | Langsdorf | C03B 23/092 |
| 2019/0352038 | A1* | 11/2019 | Langsdorf | C03B 23/099 |
| 2021/0196568 | A1* | 7/2021 | Yamashita | A61K 45/06 |
| 2022/0168185 | A1* | 6/2022 | Redkar | A61J 1/1412 |

OTHER PUBLICATIONS

European Office Action dated Dec. 9, 2022 for European Patent Application No. 22183917.8 (4 pages).

* cited by examiner continuation FIG. 7C

GLASS CONTAINERS FOR PACKAGING SALT OR SUGAR-CONTAINING COMPOSITIONS IN A FROZEN STATE

CROSS REFERENCE TO RELATED APPLICATIONS

This application claims priority to European Patent Application No. EP 22183917.8 filed on Jul. 8, 2022, which is incorporated in its entirety herein by reference.

BACKGROUND OF THE INVENTION

1. Field of the Invention

The present invention relates a glass container. The present invention also relates to a process for the preparation of a glass container, to a glass container obtainable by this process, to a process for the preparation of a filled glass container, a filled glass container obtainable by this process and to the use of a glass container for packaging a pharmaceutical composition.

2. Description of the Related Art

In the pharmaceutical industry, containers are used for the primary packaging of drugs. Among the traditionally most used materials is a glass container, as it ensures stability, visibility, endurance, rigidity, moisture resistance, ease of capping, and economy. The glass containers for medical purposes currently on the market include glass containers, made from glass tubing and blow-molded glass containers. The manufacturing methods for tubing-based glass containers and blow-molded glass containers are widely known. Tubing based glass containers are made from prefabricated glass tubing (mother tube) by shaping and separation. In a typical manufacturing process, a glass tube is loaded into the head of a rotary machine, and then, while rotating around its major axis, the tube is heated to its softening point by a flame and is pulled along its major axis for stretching and spreading the portion that has been subjected to heat softening to create and shape the bottom of the desired container. Tubular glass containers include vials, ampoules, bottles, cylindrical injector and syringe bodies, whose shape and size are standard.

Pharmaceutical compositions that are contained in a glass vial as described above are often frozen or freeze-dried within the glass container. Such a freezing-step is, for example, performed when aqueous pharmaceutical compositions comprising temperature-sensitive ingredients, such as mRNA-vaccines, are to be stored for longer periods of time in refrigerators and/or if aqueous pharmaceutical compositions contained in a glass container are subjected to a lyophilisation process for that purpose. However, one problem that can be encountered during freezing or lyophilization is the occasional failure of the glass vial. For lyophilization this condition is also referred to as "lyo-breakage." Lyo-breakage results in lost product, additional costs to remediate any spillage, and inspection time to ensure that all broken vials are discarded. It has been observed that the major factor for such a lyo-breakage is actually not the thermal stress from processing temperatures that occurs during lyophilization, but rather the stress in the glass caused by an internal force from product expansion during freezing (Machak and Smay: "Failure of Glass Tubing Vials during Lyophilization"; Journal of Pharmaceutical Science and Technology (2019), Vol. 73 (1), pages 30-38). In this context it also has been observed that, if a liquid composition is frozen or freeze-dried in a glass vial, tensile stresses occur that predominantly act on the inside and the outside of the glass tube, but not on the inside and the outside of the circular glass bottom. The reason for this difference in the tensile stresses acting on the glass tube on the one side and the circular glass bottom on the other side can be seen in the fact that, if the liquid composition starts to freeze, the liquid or ice "creeps up" the walls of the glass tube, such that the tensile stresses that act on the glass bottom are reduced accordingly.

Thus, in order to improve the resistance of a glass container to tensile stresses that occur when freezing or freeze-drying a liquid composition in a glass vial, one would assume that it is sufficient to solely increase the thickness of the side wall of the glass tube. However, although this approach actually works for a number of pharmaceutical compositions, it has been observed that when freezing sugar- or salt-containing aqueous compositions in a glass vial, a simple increase of the thickness of the glass tube is not sufficient in order to reduce breakage.

What is needed in the art is a way to at least partly overcome a disadvantage arising from the prior art. What is needed in the art is a way to provide a glass container for pharmaceutical packaging, particularly for packaging aqueous pharmaceutical compositions comprising components which increase the friction on glass, such as sugars or salts, which is characterized by an increased resistance towards tensile stresses that occur when freezing or freeze-drying the pharmaceutical compositions within the glass container. What is also needed in the art is a way to provide a glass container for pharmaceutical packaging, particularly for packaging aqueous pharmaceutical compositions comprising components which increase the friction on glass, such as sugars or salts, which is characterized by a reduced breakage. What is also needed in the art is a process by which such an advantageous glass container can be prepared in a simple and cost-effective manner.

SUMMARY OF THE INVENTION

In some exemplary embodiments provided according to the invention, a glass container includes: i) a glass tube with a first end, a further end, an outer diameter ($d_1$) and a glass thickness ($s_1$); ii) a glass bottom closing the glass tube at the first end and including an inner surface directed to an inside of the glass container and an outer surface directed to an outside of the glass container; and iii) a curved glass heel extending from an outer end of the glass bottom to the first end of the glass tube. The glass container is characterized by a longitudinal axis ($L_{tube}$) that passes through a center of the glass bottom. For any cut surface of the glass container that is obtainable by cutting the glass container in a plane that includes the longitudinal axis $L_{tube}$ a minimum thickness ($s_{min}$) and a maximum thickness ($s_{max}$) of the glass bottom determined at any position having a distance $d_1/4$ or less to longitudinal axis $L_{tube}$ and a thickness ($s_{d1/4}$) is the thickness of the glass bottom determined at a position having the distance $d_1/4$ to the longitudinal axis $L_{tube}$, the distance to the longitudinal axis $L_{tube}$ in each case being determined in a direction that is perpendicular to the longitudinal axis $L_{tube}$ and thicknesses $s_{min}$, $s_{max}$ and $s_{d1/4}$ being determined in a direction that is parallel to longitudinal axis $L_{tube}$; where $s_{max}/s_{min}$ less than 1.8. The following conditions are fulfilled: I) $s_1 \times s_{d1/4}$ is in a range from 1.1 to 6 $mm^2$ for a glass container having an overflow capacity of not more than 20 ml; II) $s_1 \times s_{d1/4}$ is in a range from 1.4 to 9 $mm^2$ for a glass container having an overflow capacity of more than 20 ml and less than 50 ml; III) $s_1 \times s_{d1/4}$ in a range from 2.3 to 13 $mm^2$ for a glass container having an overflow capacity of at least 50 ml and less than 100 ml; and IV) $s_1 \times s_{d1/4}$ is in the range from 3 to 17 $mm^2$ for a glass container having an overflow capacity of at least 100 ml. The overflow capacity is a maximum volume of liquid that the glass container can hold if filled to the point of overflowing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
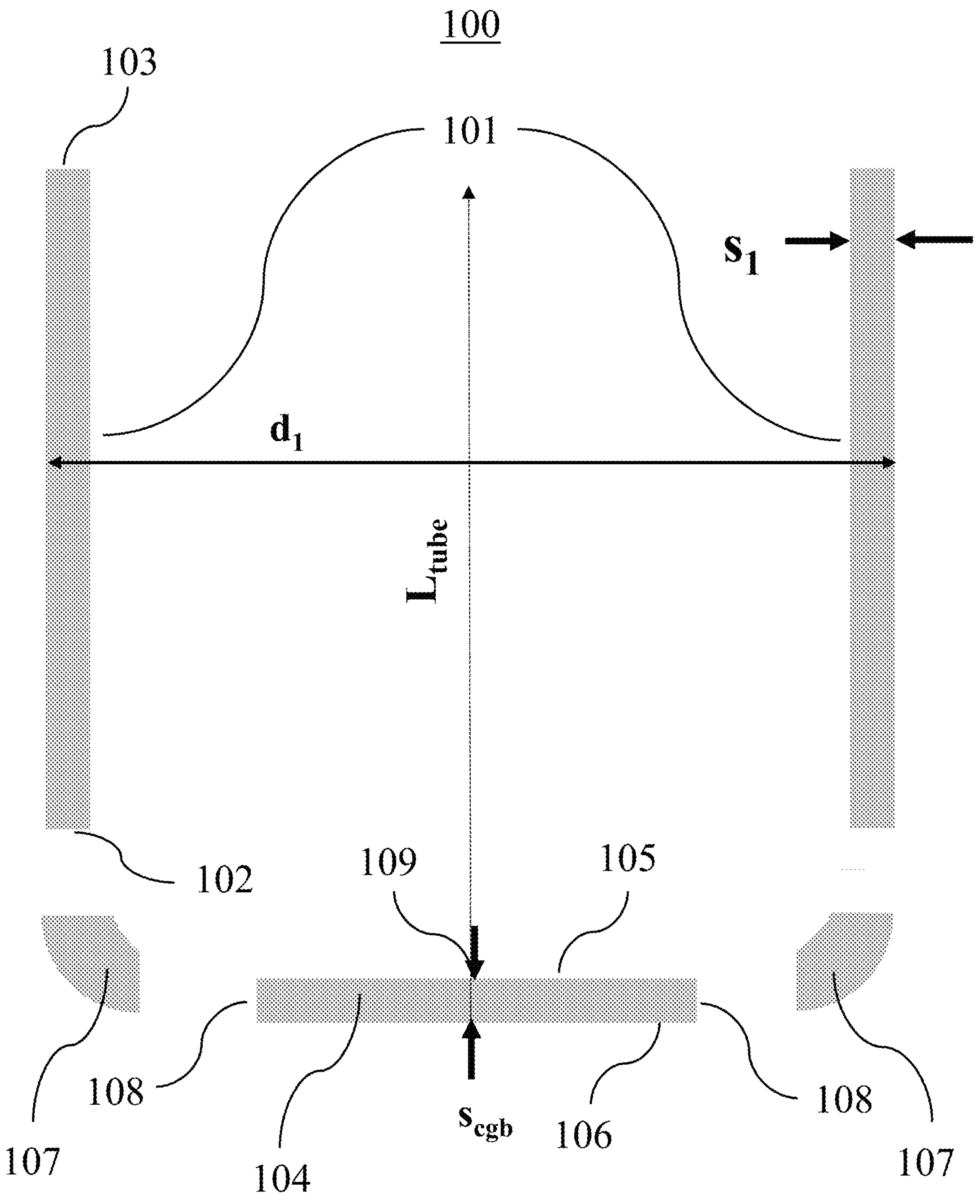
FIG. 1 illustrates a cross-sectional view of a glass container provided according to the invention where for the purpose of an improved illustration the parts of the glass container have been separated from each other.

In some embodiments provided according to the invention, a glass container includes as container parts: a glass tube with a first end, a further end, an outer diameter $d_1$ and a glass thickness $s_1$; a glass bottom, wherein the glass bottom closes the glass tube at the first end and comprises an inner surface directed to the inside of the glass container and an outer surface directed to the outside of the glass container; a curved glass heel extending from an outer end of the glass bottom to the first end of the glass tube; wherein the glass container is characterized by a longitudinal axis $L_{tube}$ that passes through the center of the glass bottom; wherein for any cut surface of the glass container that is obtainable by cutting the glass container in a plane that includes the longitudinal axis $L_{tube}$ thickness $s_{min}$ is the minimum and thickness $s_{max}$ the maximum thickness of the circular glass bottom determined at any position having the distance $d_1/4$ or less to longitudinal axis $L_{tube}$ and thickness $s_{d1/4}$ is the thickness of the glass bottom determined at a position having the distance $d_1/4$ to longitudinal axis $L_{tube}$, the distance to longitudinal axis $L_{tube}$ in each case being determined in a direction that is perpendicular to longitudinal axis $L_{tube}$ and thickness $s_{min}$, $s_{max}$ and $s_{d1/4}$ being determined in a direction that is parallel to longitudinal axis $L_{tube}$; wherein $s_{max}/s_{min}$ is less than 1.8, optionally less than 1.6, optionally less than 1.5, optionally less than 1.4, optionally less than 1.3, optionally less than 1.2 and optionally less than 1.1; and wherein the following conditions are fulfilled:

I) for a glass container having an overflow capacity of not more than 20 ml and optionally of at least 0.1 ml, $s_1 \times s_{d1/4}$ is in the range from 1.1 to 6 $mm^2$; optionally in the range from 1.1 to 3 $mm^2$; optionally in the range from 1.1 to 2.5 $mm^2$; optionally in the range from 1.2 to 2 $mm^2$; optionally in the range from 1.3 to 1.7 $mm^2$; optionally in the range from 1.35 to 1.55 $mm^2$; optionally in the range from 1.4 to 1.5 $mm^2$;

II) for a glass container having an overflow capacity of more than 20 ml and not more than 50 ml, $s_1 \times s_{d1/4}$ is in the range from 1.4 to 9 $mm^2$; optionally in the range from 1.5 to 5 $mm^2$; optionally in the range from 1.6 to 4 $mm^2$; optionally in the range from 1.65 to 3.5 $mm^2$; optionally in the range from 1.7 to 2.8 $mm^2$; optionally in the range from 1.7 to 2.4 $mm^2$; most optionally in the range from 1.75 to 2.0 $mm^2$;

III) for a glass container having an overflow capacity of more than 50 ml and not more than 100 ml, $s_1 \times s_{d1/4}$ is in the range from 2.3 to 13 $mm^2$; optionally in the range from 2.4 to 10 $mm^2$; optionally in the range from 2.45 to 7.5 $mm^2$; optionally in the range from 2.5 to 5 $mm^2$; optionally in the range from 2.6 to 4 $mm^2$; optionally in the range from 2.65 to 3.5 $mm^2$; optionally in the range from 2.7 to 3.1 $mm^2$;

IV) for a glass container having an overflow capacity of more than 100 ml and optionally of less than 200 ml, $s_1 \times s_{d1/4}$ is in the range from 3 to 17 $mm^2$; optionally in the range from 3.1 to 12 $mm^2$; optionally in the range from 3.2 to 10.5 $mm^2$; optionally in the range from 3.3 to 9 $mm^2$; optionally in the range from 3.4 to 7 $mm^2$; optionally in the range from 3.45 to 5.5 $mm^2$; optionally in the range from 3.5 to 4 $mm^2$;

wherein the overflow capacity is the maximum volume of liquid that the glass container can hold if filled to the point of overflowing.

In some embodiments of the glass container provided according to the present invention, for any cut surface of the glass container that is obtainable by cutting the glass container in a plane that includes the longitudinal axis $L_{tube}$ the curved glass heel is defined by an outer radius $r_o$, an inner radius $r_i$ and a thickness of the glass $s_h$ determined at a position at which a tangent line that includes an angle of 45° with longitudinal axis $L_{tube}$ touches the outer surface of the curved glass heel, thickness $s_h$ being determined in a direction perpendicular to that tangent line;

wherein the following condition is fulfilled:

IA) for a glass container having an overflow capacity of not more than 9 ml and optionally of at least 0.1 ml, $s_1 \times r_i \times s_h \times s_{d1/4}$ is in the range from 0.4 to 7 $mm^4$; optionally in the range from 0.55 to 4 $mm^4$; optionally in the range from 0.6 to 2.5 $mm^4$; optionally in the range from 0.65 to 1.75 $mm^4$; optionally in the range from 0.7 to 1 $mm^4$;

IB) for a glass container having an overflow capacity of more than 9 ml and not more than 20 ml, $s_1 \times r_i \times s_h \times s_{d1/4}$ is in the range from 0.8 to 7.5 $mm^4$; optionally in the range from 1 to 5 $mm^4$; optionally in the range from 1.1 to 2.5 $mm^4$; optionally in the range from 1.2 to 1.6 $mm^4$; optionally in the range from 1.3 to 1.5 $mm^4$;

I) I for a glass container having an overflow capacity of more than 20 ml and not more than 50 ml, $s_1 \times r_i \times s_h \times s_{d1/4}$ is in the range from 1.75 to 13 $mm^4$; optionally in the range from 2 to 8 $mm^4$; optionally in the range from 2.3 to 4 $mm^4$; optionally in the range from 2.45 to 3.5 $mm^4$; optionally in the range from 2.6 to 3.1 $mm^4$;

III) for a glass container having an overflow capacity of more than 50 ml and not more than 100 ml, $s_1 \times r_i \times s_h \times s_{d1/4}$ is in the range from 6.5 to 35 $mm^4$; optionally in the range from 7 to 27 $mm^4$; optionally in the range from 7.5 to 20 $mm^4$; optionally in the range from 9 to 15 $mm^4$; optionally in the range from 10.5 to 12.5 $mm^4$;

IV) for a glass container having an overflow capacity of more than 100 ml and optionally of less than 200 ml, $s_1 \times r_i \times s_h \times s_{d1/4}$ is in the range from 9 to 52 $mm^4$; optionally in the range from 10 to 30 $mm^4$; optionally in the range from 11 to 28 $mm^4$; optionally in the range from 12 to 25 $mm^4$; optionally in the range from 14 to 16 $mm^4$.

In some embodiments of the glass container provided according to the present invention, for any cut surface of the glass container that is obtainable by cutting the glass container in a plane that includes the longitudinal axis $L_{tube}$ distance q (i. e., the heel overhang) is the distance between a first line $l_1$ that runs parallel to longitudinal axis $L_{tube}$ and that touches the outer surface of the glass tube and a second line $l_2$ that runs parallel to the first line $l_1$ and that passes through the glass bottom at a point $P_3$ which has the largest distance to longitudinal axis $L_{tube}$ from all the points on the outer surface of the glass bottom that, when the glass container is placed on a support, touches the support;

wherein the following condition is fulfilled:

IA) for a glass container having an overflow capacity of not more than 9 ml and optionally of at least 0.1 ml, $(s_1 \times r_i \times s_h \times s_{d1/4})/q$ is in the range from 0.28 to 2.5 $mm^3$; optionally in the range from 0.3 to 2.0 $mm^3$; optionally in the range from 0.32 to 1.5 $mm^3$; optionally in the range from 0.34 to 1.0 $mm^3$; optionally in the range from 0.36 to 0.8 $mm^3$; optionally in the range from 0.4 to 0.55 $mm^3$;

IB) for a glass container having an overflow capacity of more than 9 ml and not more than 20 ml, $(s_1 \times r_i \times s_h \times s_{d1/4})/q$ is in the range from 0.4 to 2.5 $mm^3$; optionally in the range from 0.45 to 2.35 $mm^3$; optionally in the range from 0.5 to 2.2 $mm^3$; optionally in the range from 0.55 to 1.85 $mm^3$; optionally in the range from 0.6 to 1.5 $mm^3$; optionally in the range from 0.65 to 0.8 $mm^3$;

II) for a glass container having an overflow capacity of more than 20 ml and not more than 50 ml, $(s_1 \times r_i \times s_h \times s_{d1/4})/q$ is in the range from 0.7 to 3.5 $mm^3$; optionally in the range from 0.75 to 3 $mm^3$; optionally in the range from 0.8 to 2.5 $mm^3$; optionally in the range from 0.9 to 2 $mm^3$; optionally in the range from 0.95 to 1.65 $mm^3$; optionally in the range from 1 to 1.3 $mm^3$;

III) for a glass container having an overflow capacity of more than 50 ml and not more than 100 ml, $(s_1 \times r_i \times s_h \times s_{d1/4})/q$ is in the range from 1.65 to 8 $mm^3$; optionally in the range from 1.8 to 5 $mm^3$; optionally in the range from 1.9 to 4 $mm^3$; optionally in the range from 2.2 to 3.7 $mm^3$; optionally in the range from 2.5 to 3.5 $mm^3$; optionally in the range from 2.7 to 3.1 $mm^3$;

IV) for a glass container having an overflow capacity of more than 100 ml and optionally of less than 200 ml, $(s_1 \times r_i \times s_h \times s_{d1/4})/q$ is in the range from 2.2 to 11 $mm^3$; optionally in the range from 2.35 to 9.5 $mm^3$; optionally in the range from 2.5 to 8 $mm^3$; optionally in the range from 3 to 5 $mm^3$; optionally in the range from 3.25 to 4.5 $mm^3$; optionally in the range from 3.5 to 4 $mm^3$.

In some embodiments of the glass container provided according to the present invention, IA) for a glass container having an overflow capacity of not more than 9 ml and optionally of at least 0.1 ml:

$s_1$ is in a range from 1.0 to 2.5 mm; optionally in the range from 1.05 to 2.0 mm; optionally in the range from 1.1 to 1.5 mm; optionally in the range from 1.10 to 1.4 mm; optionally in the range from 1.15 to 1.25 mm;

$s_{d1/4}$ is in a range from 0.7 to 2 mm; optionally in the range from 0.9 to 1.8 mm; optionally in the range from 1.1 to 1.4 mm; optionally in the range from 1.15 to 1.35 mm; optionally in the range from 1.2 to 1.3 mm;

$s_{min}$ is in a range from 0.7 to 1.6 mm; optionally in the range from 0.9 to 1.5 mm; optionally in the range from 1.1 to 1.4 mm; optionally in the range from 1.15 to 1.35 mm; optionally in the range from 1.2 to 1.3 mm;

$s_{max}$ is in a range from 1.0 to 1.7 mm; optionally in the range from 1.1 to 1.6 mm; optionally in the range from 1.2 to 1.55 mm; optionally in the range from 1.3 to 1.5 mm; optionally in the range from 1.35 to 1.45 mm;

$s_h$ is in a range from 0.9 to 1.5 mm; optionally in the range from 1 to 1.4 mm; optionally in the range from 1.05 to 1.3 mm; optionally in the range from 1.1 to 1.25 mm; optionally in the range from 1.15 to 1.2 mm;

$r_i$ is in a range from 0.2 to 0.8 mm; optionally in the range from 0.25 to 0.7 mm; optionally in the range from 0.3 to 0.6 mm; optionally in the range from 0.35 to 0.55 mm; optionally in the range from 0.4 to 0.5 mm;

q is in a range from 1.2 to 2 mm; optionally in the range from 1.3 to 1.9 mm; optionally in the range from 1.4 to 1.8 mm; optionally in the range from 1.5 to 1.7 mm; optionally in the range from 1.55 to 1.65 mm;

IB) for a glass container having an overflow capacity of more than 9 ml and not more than 20 ml:

$s_1$ is in a range from 1.9 to 3.1 mm; optionally in the range from 2.1 to 2.9 mm; optionally in the range from 2.3 to 2.7 mm; optionally in the range from 2.4 to 2.6 mm; optionally in the range from 2.45 to 2.55 mm;

$s_{d1/4}$ is in a range from 1.8 to 2.7 mm; optionally in the range from 1.9 to 2.6 mm; optionally in the range from 2 to 2.5 mm; optionally in the range from 2.1 to 2.4 mm; optionally in the range from 2.15 to 2.35 mm;

$s_{min}$ is in a range 0.7 to 3 mm; optionally in the range from 0.93 to 2.5 mm; optionally in the range from 1.16 to 2.8 mm; optionally in the range from 1.28 to 2.0 mm; optionally in the range from 1.38 to 1.5 mm;

$s_{max}$ is in a range from 0.93 to 4.0 mm; optionally in the range from 1.17 to 3.5 mm; optionally in the range from 1.28 to 2.8 mm; optionally in the range from 1.4 to 2.0 mm; optionally in the range from 1.52 to 1.6 mm;

$s_h$ is in a range from 1.9 to 3.1 mm; optionally in the range from 2.1 to 2.9 mm; optionally in the range from 2.3 to 2.7 mm; optionally in the range from 2.4 to 2.6 mm; optionally in the range from 2.45 to 2.55 mm;

$r_i$ is in a range from 0.25 to 0.9 mm; optionally in the range from 0.3 to 0.8 mm; optionally in the range from 0.35 to 0.7 mm; optionally in the range from 0.4 to 0.6 mm; optionally in the range from 0.45 to 0.55 mm;

q is in a range from 1.9 to 5 mm; optionally in the range from 2.2 to 4 mm; optionally in the range from 2.5 to 3.7 mm; optionally in the range from 2.7 to 3.3 mm; optionally in the range from 2.9 to 3.1 mm;

II) for a glass container having an overflow capacity of more than 20 ml and not more than 50 ml:

$s_1$ is in a range from 1.9 to 5 mm; optionally in the range from 2.2 to 4 mm; optionally in the range from 2.5 to 3.7 mm; optionally in the range from 2.7 to 3.3 mm; optionally in the range from 2.9 to 3.1 mm;

$s_{d1/4}$ is in a range from 2.1 to 4 mm; optionally in the range from 2.3 to 3.5 mm; optionally in the range from 2.5 to 2.9 mm; optionally in the range from 2.6 to 2.8 mm; optionally in the range from 2.65 to 2.75 mm;

$s_{min}$ is in a range 0.7 to 3.6 mm; optionally in the range from 0.93 to 3.0 mm; optionally in the range from 1.16 to 3.36 mm; optionally in the range from 1.28 to 2.4 mm; optionally in the range from 1.38 to 1.8 mm;

$s_{max}$ is in a range from 0.93 to 4.8 mm; optionally in the range from 1.17 to 4.2 mm; optionally in the range from 1.28 to 3.36 mm; optionally in the range from 1.4 to 2.4 mm; optionally in the range from 1.52 to 1.92 mm;

$s_h$ is in a range from 1.9 to 5 mm; optionally in the range from 2.2 to 4 mm; optionally in the range from 2.5 to 3.7 mm; optionally in the range from 2.7 to 3.3 mm; optionally in the range from 2.9 to 3.1 mm;

$r_i$ is in a range from 0.25 to 0.9 mm; optionally in the range from 0.3 to 0.8 mm; optionally in the range from 0.35 to 0.7 mm; optionally in the range from 0.4 to 0.6 mm; optionally in the range from 0.45 to 0.55 mm;

q is in a range from 2.8 to 5 mm; optionally in the range from 3 to 4 mm; optionally in the range from 3.2 to 3.8 mm; optionally in the range from 3.4 to 3.6 mm; optionally in the range from 3.45 to 3.55 mm;

III) for a glass container having an overflow capacity of more than 50 ml and not more than 100 ml:

$s_1$ is in a range from 3 to 5 mm; optionally in the range from 3.2 to 4.5 mm; optionally in the range from 3.5 to 4 mm; optionally in the range from 3.6 to 3.9 mm; optionally in the range from 3.7 to 3.8 mm;

$s_{d1/4}$ is in a range from 3 to 5 mm; optionally in the range from 3.1 to 4.5 mm; optionally in the range from 3.2 to 3.8 mm; optionally in the range from 3.3 to 3.5 mm; optionally in the range from 3.35 to 3.45 mm;

$s_{min}$ is in a range 0.9 to 4.5 mm; optionally in the range from 1.2 to 4.2 mm; optionally in the range from 1.49 to 3.75 mm; optionally in the range from 1.65 to 3.0 mm; optionally in the range from 1.77 to 2.25 mm;

$s_{max}$ is in a range from 1.2 to 6 mm; optionally in the range from 1.5 to 5.25 mm; optionally in the range from 1.65 to 4.2 mm; optionally in the range from 1.8 to 3.0 mm; optionally in the range from 1.95 to 2.4 mm;

$s_h$ is in a range from 3 to 5 mm; optionally in the range from 3.2 to 4.5 mm; optionally in the range from 3.5 to 4 mm; optionally in the range from 3.6 to 3.9 mm; optionally in the range from 3.7 to 3.8 mm;

$r_i$ is in a range from 0.4 to 1.2 mm; optionally in the range from 0.5 to 1 mm; optionally in the range from 0.6 to 0.9 mm; optionally in the range from 0.65 to 0.85 mm; optionally in the range from 0.7 to 0.8 mm;

q is in a range from 3.8 to 6 mm; optionally in the range from 4 to 5 mm; optionally in the range from 4.2 to 4.8 mm; optionally in the range from 4.4 to 4.6 mm; optionally in the range from 4.45 to 4.55 mm;

IV) for a glass container having an overflow capacity of more than 100 ml and optionally of less than 200 ml:

$s_1$ is in a range from 3 to 6 mm; optionally in the range from 3.5 to 5.5 mm; optionally in the range from 4 to 4.8 mm; optionally in the range from 4.1 to 4.4 mm; optionally in the range from 4.2 to 4.3 mm;

$s_{d1/4}$ is in a range from 3 to 5.5 mm; optionally in the range from 3.3 to 4.8 mm; optionally in the range from 3.6 to 4.4 mm; optionally in the range from 3.7 to 4 mm; optionally in the range from 3.8 to 3.9 mm;

$s_{min}$ is in a range 0.9 to 4.5 mm; optionally in the range from 1.2 to 3.75 mm; optionally in the range from 1.49 to 4.2 mm; optionally in the range from 1.65 to 3.0 mm; optionally in the range from 1.77 to 2.25 mm;

$s_{max}$ is in a range from 1.2 to 6 mm; optionally in the range from 1.5 to 5.25 mm; optionally in the range from 1.65 to 4.25 mm; optionally in the range from 1.8 to 3.0 mm; optionally in the range from 1.95 to 2.4 mm;

$s_h$ is in a range from 3 to 6 mm; optionally in the range from 3.5 to 5.5 mm; optionally in the range from 4 to 4.8 mm; optionally in the range from 4.1 to 4.4 mm; optionally in the range from 4.2 to 4.3 mm;

$r_i$ is in a range from 0.4 to 1.2 mm; optionally in the range from 0.5 to 1 mm; optionally in the range from 0.6 to 0.9 mm; optionally in the range from 0.65 to 0.85 mm; optionally in the range from 0.7 to 0.8 mm;

q is in a range from 3 to 8 mm; optionally in the range from 3.5 to 7 mm; optionally in the range from 4 to 6 mm; optionally in the range from 4.5 to 5.5 mm; optionally in the range from 4.75 to 5.35 mm.

In some embodiments of the glass container provided according to the present invention, for any cut surface of the glass container that is obtainable by cutting the glass container in a plane that includes the longitudinal axis $L_{tube}$, line $l_1$ is a first line that runs parallel to longitudinal axis $L_{tube}$ and that touches the outer surface of the glass tube and line $l_2$ is a second line that runs parallel to the first line $l_1$ and that passes through the glass bottom at a point $P_3$ which has the largest distance to longitudinal axis $L_{tube}$ from all the points on the outer surface of the glass bottom that, when the glass container is placed on a support, touches the support, and wherein the distance of point $P_3$ to longitudinal axis $L_{tube}$ is x, wherein the following condition is fulfilled: $x>0.7\times d_1/2$, optionally $x>0.72\times d_1/2$, optionally $x>0.74\times d_1/2$, optionally $x>0.76\times d_1/2$ and optionally $x>0.78\times d_1/2$.

In some embodiments of the glass container provided according to the present invention, the following condition is fulfilled: $s_h^3/(r_o\times s_1)>0.8$ mm; optionally $s_h^3/(r_o\times s_1)>1.0$ mm, optionally $s_h^3/(r_o\times s_1)>1.2$ mm, optionally $s_h^3/(r_o\times s_1)>1.5$ mm and optionally $s_h^3/(r_o\times s_1)>2.0$ mm.

In some embodiments of the glass container provided according to the present invention, $r_o$ is >0.5 mm, wherein $r_o$ may be in the range from 0.5 to 4.0 mm, optionally in the range from 1.1 to 3.0 mm, optionally in the range from 1.2 to 2.5 mm, optionally in the range from 1.3 to 2.0 mm and optionally in the range from 1.4 to 1.7 mm.

In some embodiments of the glass container provided according to the present invention, the following condition is fulfilled: $r_i+s_h-r_o>0$ mm, optionally >0.1 mm, optionally >0.25 mm, optionally >0.5 mm and optionally >0.75 mm.

In some embodiments of the glass container provided according to the present invention, the following condition is fulfilled: $s_h>1.05\times s_1$, optionally $s_h>1.15\times s_1$, optionally $s_h>1.25\times s_1$, optionally $s_h>1.4\times s_1$ and optionally $s_h>1.6\times s_1$.

In some embodiments of the glass container provided according to the present invention, the glass container is a tubular glass container glass container prepared from prefabricated glass tubing by shaping and separation.

In some embodiments of the glass container provided according to the present invention, the glass container is thermally tempered, chemically tempered or both.

In some embodiments of the glass container provided according to the present invention, the glass tube is a cylindrical glass tube and wherein the glass bottom is a circular glass bottom.

In some embodiments of the glass container provided according to the present invention, the glass container comprises a top region in which the inner diameter of the glass tube is $d_t$ and a body region in which the inner diameter of the glass tube is $d_2$, wherein $d_2>d_t$ and wherein the glass container comprises a shoulder region that connects the body region with the top region, wherein shoulder region is characterized by a shoulder angle $\alpha$ and wherein $\alpha$ is in the range from 10 to 70°, optionally in the range from 25 to 60°, optionally in the range from 33 to 55°, optionally in the range from 37 to 50° and optionally in the range from 38° to 45°.

In some embodiments of the glass container provided according to the present invention, the glass container in the container part from the glass bottom up to the shoulder region is rotation-symmetric around the longitudinal axis that goes perpendicular through the center of the glass bottom.

In some embodiments of the glass container provided according to the present invention, throughout the body region the wall thickness $s_1$ of the glass tube is in a range from ±0.2 mm, optionally ±0.1 mm, optionally ±0.08 mm and optionally ±0.05 mm, in each case based on a mean value of this wall thickness in the body region. T.

In some embodiments of the glass container provided according to the present invention, the glass container is a packaging container for a medical or a pharmaceutical packaging good or both. An exemplary pharmaceutical packaging good is a pharmaceutical composition. Optionally, the glass container is suitable for packaging parenteralia in accordance with section 3.2.1 of the European Pharmacopoeia, 7th edition from 2011.

In some embodiments of the glass container provided according to the present invention, the glass container is a vial.

In some embodiments of the glass container provided according to the present invention, the glass is of a type selected from the group consisting of a borosilicate glass, an aluminosilicate glass, soda lime glass and fused silica. "Soda lime glass" according to the invention is an alkaline/alkaline earth/silicate glass according to table 1 of ISO 12775 (1st edition 1997 Oct. 15).

In some embodiments of the glass container provided according to the present invention, the glass container comprises a coating that at least partially superimposes the exterior surface, the interior surface or the exterior and the interior surface of the glass tube.

In some embodiments of the glass container provided according to the present invention, the coating comprises a silicone, a silane or a mixture thereof, wherein the silicone or the silane can be crosslinked or non-crosslinked. Suitable silanes and silicones for treating the surface of glass containers are, for example, disclosed in US 2011/0006028 A1, U.S. Pat. No. 4,420,578 or in WO 2014/105350 A3.

In some embodiments of the glass container provided according to the present invention, the coating optionally comprises a coupling agent layer positioned on the exterior surface (i. e. the surface opposite to the interior surface that directed to the interior volume $V_i$ of the glass container) of the glass tube, the coupling agent layer comprising a coupling agent; and a polymer layer positioned over the coupling agent layer, the polymer layer comprising a polymer chemical composition. Optionally, the coating is a coating as described in US 2013/171456 A1.

In some embodiments of the glass container provided according to the present invention, the interior volume $V_i$ of the glass container comprises a pharmaceutical composition. Optionally, the pharmaceutical composition comprises at least one component that increases the friction on glass, optionally a sugar, a salt or a mixture thereof, optionally a sugar selected from the group consisting of sucrose, mannitol or a mixture thereof.

In some embodiments of the glass container provided according to the present invention, the pharmaceutical composition is a frozen or freeze-dried pharmaceutical composition, optionally a frozen or freeze-dried composition comprising at least one component that increases the friction on glass, optionally a sugar, a salt or a mixture thereof, optionally a sugar selected from the group consisting of sucrose, mannitol or a mixture thereof.

In some embodiments of the glass container provided according to the present invention, the pharmaceutical composition is an mRNA-vaccine.

In some embodiments of the glass container provided according to the present invention, the glass container comprises a closure at the top of the glass container, optionally a lid.

In some exemplary embodiments provided according to the invention, a process for making a glass container, optionally a glass container provided according to the invention, comprises:

A) loading a glass tube having a first end and a further end into a machine, optionally a rotary machine, the glass tube having a longitudinal axis $L_{tube}$, an outer diameter $d_1$ and a wall thickness $s_1$; wherein IA) for a glass container having an overflow capacity of not more than 9 ml and optionally of at least 0.1 ml, $s_1$ is in a range from 1.0 to 2.5 mm, optionally in the range from 1.05 to 2.0 mm, optionally in the range from 1.1 to 1.5 mm, optionally in the range from 1.10 to 1.4 mm, optionally in the range from 1.15 to 1.25 mm;

IB) for a glass container having an overflow capacity of more than 9 ml and not more than 20 ml, $s_1$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

II) for a glass container having an overflow capacity of more than 20 ml and not more than 50 ml, $s_1$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

III) for a glass container having an overflow capacity of more than 50 ml and not more than 100 ml, $s_1$ is in a range from 3 to 5 mm, optionally in the range from 3.2 to 4.5 mm, optionally in the range from 3.5 to 4 mm, optionally in the range from 3.6 to 3.9 mm, optionally in the range from 3.7 to 3.8 mm;

IV) for a glass container having an overflow capacity of more than 100 ml and optionally of less than 200 ml, $s_1$ is in a range from 3 to 6 mm, optionally in the range from 3.5 to 5.5 mm, optionally in the range from 4 to 4. mm, optionally in the range from 4.1 to 4.4 mm, optionally in the range from 4.2 to 4.3 mm;

wherein the overflow capacity is the maximum volume of liquid that the glass container can hold if filled to the point of overflowing;

B) heating the glass tube, while rotating around its major axis, to a temperature above its glass transition temperature, optionally above its softening temperature, with a heating element, optionally with a flame;

C) pulling the heated glass tube, while rotating around its major axis, for stretching and creating a container closure;

D) while the heated glass tube is still rotating around its major axis, shaping the container closure, optionally while still having a temperature above its glass transition temperature, optionally above its softening temperature, so as to obtain a glass bottom and a curved glass heel via which the glass bottom is connected to the glass tube, for the formation of a glass container, wherein for any cut surface of the glass container that is obtainable by cutting the glass container in a plane that includes the longitudinal axis $L_{tube}$ thickness $s_{min}$ is the minimum and thickness $s_{max}$ the maximum thickness of the circular glass bottom determined at any position having the distance $d_1/4$ or less to longitudinal axis $L_{tube}$ and $s_{d1/4}$ is the thickness of the glass bottom determined at a position having the distance $d_1/4$ to longitudinal axis $L_{tube}$, the distance to longitudinal axis $L_{tube}$ in each case being determined in a direction that is perpendicular to longitudinal axis $L_{tube}$ and thickness $s_{min}$, $s_{max}$ and $s_{d1/4}$ being determined in a direction that is parallel to longitudinal axis $L_{tube}$, wherein shaping in process step D) is performed in such a way that $s_{max}/s_{min}$ is less than 1.8, optionally less than 1.6, optionally less than 1.5, optionally less than 1.4, optionally less than 1.3, optionally less than 1.2 and optionally less than 1.1 and that the following condition is fulfilled:

I) for a glass container having an overflow capacity of not more than 20 ml and optionally of at least 0.1 ml, $s_1 \times s_{d1/4}$ is in the range from 1.1 to 6 $mm^2$; optionally in the range from 1.1 to 3 $mm^2$; optionally in the range from 1.1 to 2.5 $mm^2$; optionally in the range from 1.2 to 2 $mm^2$; optionally in the range from 1.3 to 1.7 $mm^2$; optionally in the range from 1.35 to 1.55 $mm^2$; optionally in the range from 1.4 to 1.5 $mm^2$;

II) for a glass container having an overflow capacity of more than 20 ml and not more than 50 ml, $s_1 \times s_{d1/4}$ is in the range from 1.4 to 9 $mm^2$; optionally in the range from 1.5 to 5 $mm^2$; optionally in the range from 1.6 to 4 $mm^2$; optionally in the range from 1.65 to 3.5 $mm^2$; optionally in the range from 1.7 to 2.8 $mm^2$; optionally in the range from 1.7 to 2.4 $mm^2$; optionally in the range from 1.75 to 2.0 $mm^2$;

III) for a glass container having an overflow capacity of more than 50 ml and not more than 100 ml, $s_1 \times s_{d1/4}$ is in the range from 2.3 to 13 $mm^2$; optionally in the range from 2.4 to 10 $mm^2$; optionally in the range from 2.45 to 7.5 $mm^2$; optionally in the range from 2.5 to 5 $mm^2$; optionally in the range from 2.6 to 4 $mm^2$; optionally in the range from 2.65 to 3.5 $mm^2$; optionally in the range from 2.7 to 3.1 $mm^2$;

IV) for a glass container having an overflow capacity of more than 100 ml and optionally of less than 200 ml, $s_1 \times s_{d1/4}$ is in the range from 3 to 17 $mm^2$; optionally in the range from 3.1 to 12 $mm^2$; optionally in the range from 3.2 to 10.5 $mm^2$; optionally in the range from 3.3 to 9 $mm^2$; optionally in the range from 3.4 to 7 $mm^2$; optionally in the range from 3.45 to 5.5 $mm^2$; optionally in the range from 3.5 to 4 $mm^2$;

wherein the overflow capacity is the maximum volume of liquid that the glass container can hold if filled to the point of overflowing.

The "softening temperature" of the glass is the temperature at which the glass has a viscosity (determined according to ISO 7884-6:1987) of $10^{7.6}$ dPa×sec.

In some embodiments of the process provided according to the invention, in process step D) shaping is accomplished, by an adjustment of the cycle rate, optionally 40 containers per minute, by an adjustment of the rotation speed of the rotary machine, optionally to a rotation speed in the range from 300 to 500 rpm, optionally in the range from 360 to 400 rpm, by an adjustment of the heating element, optionally to a temperature in the range from 1000 to 1600° C., optionally in the range from 1100 to 1300° C., optionally by an adjustment of the shape of the flame, the position of the flame at which the glass is subjected to heat softening or a combination of these measures, by using molding tools that act on predetermined positions of the outer surface of the glass heel, optionally by using a shaping tool in the form of a circular disc, optionally by pressing a gas into the intermediate space between the surface of the molding tool and the bottom the glass container to be shaped so as to form an "air cushion" as disclosed in US 2004/025538 A1, or by a combination of at least two of these measures.

In some embodiments of the process provided according to the invention, shaping in process step D) is performed in such a way that a glass container is obtained in which for any cut surface of the glass container that is obtainable by cutting the glass container in a plane that includes the longitudinal axis $L_{tube}$ the curved glass heel is defined by an outer radius $r_o$, an inner radius $r_i$ and a thickness of the glass $s_h$ determined at a position at which a tangent line that includes an angle of 45° with longitudinal axis $L_{tube}$ touches the outer surface of the curved glass heel, thickness $s_h$ being determined in a direction perpendicular to that tangent line;

In some embodiments of the process provided according to the invention, shaping in process step D) is performed in such a way that a glass container is obtained in which for any cut surface of the glass container that is obtainable by cutting the glass container in a plane that includes the longitudinal axis $L_{tube}$ distance q is the distance between a first line $l_1$ that runs parallel to longitudinal axis $L_{tube}$ and that touches the outer surface of the glass tube and a second line $l_2$ that runs parallel to the first line $l_1$ and that passes through the glass bottom at a point $P_3$ which has the largest distance to longitudinal axis $L_{tube}$ from all the points on the outer surface of the glass bottom that, when the glass container is placed on a support, touches the support;

wherein the following condition is fulfilled:

IA) for a glass container having an overflow capacity of not more than 9 ml and optionally of at least 0.1 ml, $(s_1 \times r_i \times s_h \times s_{d1/4})/q$ is in the range from 0.28 to 2.5 $mm^3$; optionally in the range from 0.3 to 2.0 $mm^3$; optionally in the range from 0.32 to 1.5 $mm^3$; optionally in the range from 0.34 to 1.0 $mm^3$; optionally in the range from 0.36 to 0.8 $mm^3$; optionally in the range from 0.4 to 0.55 $mm^3$;

IB) for a glass container having an overflow capacity of more than 9 ml and not more than 20 ml, $(s_1 \times r_i \times s_h \times s_{d1/4})/q$ is in the range from 0.4 to 2.5 $mm^3$; optionally in the range from 0.45 to 2.35 $mm^3$; optionally in the range from 0.5 to 2.2 $mm^3$; optionally in the range from 0.55 to 1.85 $mm^3$; optionally in the range from 0.6 to 1.5 $mm^3$; optionally in the range from 0.65 to 0.8 $mm^3$;

II) for a glass container having an overflow capacity of more than 20 ml and not more than 50 ml, $(s_1 \times r_i \times s_h \times s_{d1/4})/q$ is in the range from 0.7 to 3.5 $mm^3$; optionally in the range from 0.75 to 3 $mm^3$; optionally in the range from 0.8 to 2.5 $mm^3$; optionally in the range from 0.9 to 2 $mm^3$; optionally in the range from 0.95 to 1.65 $mm^3$; optionally in the range from 1 to 1.3 $mm^3$;

III) for a glass container having an overflow capacity of more than 50 ml and not more than 100 ml, $(s_1 \times r_i \times s_h \times s_{d1/4})/q$ is in the range from 1.65 to 8 $mm^3$; optionally in the range from 1.8 to 5 $mm^3$; optionally in the range from 1.9 to 4 $mm^3$; optionally in the range from 2.2 to 3.7 $mm^3$; optionally in the range from 2.5 to 3.5 $mm^3$; optionally in the range from 2.7 to 3.1 $mm^3$;

IV) for a glass container having an overflow capacity of more than 100 ml and optionally of less than 200 ml, $(s_1 \times r_i \times s_h \times s_{d1/4})/q$ is in the range from 2.2 to 11 $mm^3$; optionally in the range from 2.35 to 9.5 $mm^3$; optionally in the range from 2.5 to 8 $mm^3$; optionally in the range from 3 to 5 $mm^3$; optionally in the range from 3.25 to 4.5 $mm^3$; optionally in the range from 3.5 to 4 $mm^3$;

In some embodiments of the process provided according to the invention, shaping in process step D) is performed in such the following condition is fulfilled:

IA) for a glass container having an overflow capacity of not more than 9 ml and optionally of at least 0.1 ml, $s_1 \times r_i \times s_h \times s_{d1/4}$ is in a range from 0.7 to 2 mm; optionally in the range from 0.9 to 1.8 mm; optionally in the range from 1.1 to 1.4 mm; optionally in the range from 1.15 to 1.35 mm; optionally in the range from 1.2 to 1.3 mm;

$s_{min}$ is in a range from 0.7 to 1.6 mm; optionally in the range from 0.9 to 1.5 mm; optionally in the range from 1.1 to 1.4 mm; optionally in the range from 1.15 to 1.35 mm; optionally in the range from 1.2 to 1.3 mm;

$s_{max}$ is in a range from 1.0 to 1.7 mm; optionally in the range from 1.1 to 1.6 mm; optionally in the range from 1.2 to 1.55 mm; optionally in the range from 1.3 to 1.5 mm; optionally in the range from 1.35 to 1.45 mm;

$s_h$ is in a range from 0.9 to 1.5 mm; optionally in the range from 1 to 1.4 mm; optionally in the range from 1.05 to 1.3 mm; optionally in the range from 1.1 to 1.25 mm; optionally in the range from 1.15 to 1.2 mm;

$r_i$ is in a range from 0.2 to 0.8 mm; optionally in the range from 0.25 to 0.7 mm; optionally in the range from 0.3 to 0.6 mm; optionally in the range from 0.35 to mm; optionally in the range from 0.4 to 0.5 mm;

q is in a range from 1.2 to 2 mm; optionally in the range from 1.3 to 1.9 mm; optionally in the range from 1.4 to 1.8 mm; optionally in the range from 1.5 to 1.7 mm; optionally in the range from 1.55 to 1.65 mm;

IB) for a glass container having an overflow capacity of more than 9 ml and not more than 20 ml, $s_1 \times r_i \times s_h \times s_{d1/4}$ is in a range from 1.8 to 2.7 mm; optionally in the range from 1.9 to 2.6 mm; optionally in the range from 2 to 2.5 mm; optionally in the range from 2.1 to 2.4 mm; optionally in the range from 2.15 to 2.35 mm;

$s_{min}$ is in a range 0.7 to 3 mm; optionally in the range from 0.93 to 2.5 mm; optionally in the range from 1.16 to 2.8 mm; optionally in the range from 1.28 to 2.0 mm; optionally in the range from 1.38 to 1.5 mm;

$s_{max}$ is in a range from 0.93 to 4.0 mm; optionally in the range from 1.17 to 3.5 mm; optionally in the range from 1.28 to 2.8 mm; optionally in the range from 1.4 to 2.0 mm; optionally in the range from 1.52 to 1.6 mm;

$s_h$ is in a range from 1.9 to 3.1 mm optionally in the range from 2.1 to 2.9 mm; optionally in the range from 2.3 to 2.7 mm; optionally in the range from 2.4 to 2.6 mm; optionally in the range from 2.45 to 2.55 mm;

$r_i$ is in a range from 0.25 to 0.9 mm; optionally in the range from 0.3 to 0.8 mm; optionally in the range from 0.35 to 0.7 mm; optionally in the range from 0.4 to 0.6 mm; optionally in the range from 0.45 to 0.55 mm;

q is in a range from 1.9 to 5 mm; optionally in the range from 2.2 to 4 mm; optionally in the range from 2.5 to 3.7 mm; optionally in the range from 2.7 to 3.3 mm; optionally in the range from 2.9 to 3.1 mm;

II) for a glass container having an overflow capacity of more than 20 ml and not more than 50 ml, $s_1 \times r_i \times s_h \times s_{d1/4}$ is in a range from 2.1 to 4 mm; optionally in the range from 2.3 to 3.5 mm; optionally in the range from 2.5 to 2.9 mm; optionally in the range from 2.6 to 2.8 mm; optionally in the range from 2.65 to 2.75 mm;

$d_{min}$ is in a range 0.7 to 3.6 mm; optionally in the range from 0.93 to 3.0 mm; optionally in the range from 1.16 to 3.36 mm; optionally in the range from 1.28 to 2.4 mm; optionally in the range from 1.38 to 1.8 mm;

$s_{max}$ is in a range from 0.93 to 4.8 mm; optionally in the range from 1.17 to 4.2 mm; optionally in the range from 1.28 to 3.36 mm; optionally in the range from 1.4 to 2.4 mm; optionally in the range from 1.52 to 1.92 mm;

$s_h$ is in a range from 1.9 to 5 mm; optionally in the range from 2.2 to 4 mm; optionally in the range from 2.5 to 3.7 mm; optionally in the range from 2.7 to 3.3 mm; optionally in the range from 2.9 to 3.1 mm;

$r_i$ is in a range from 0.25 to 0.9 mm; optionally in the range from 0.3 to 0.8 mm; optionally in the range from 0.35 to 0.7 mm; optionally in the range from 0.4 to mm; optionally in the range from 0.45 to 0.55 mm;

q is in a range from 2.8 to 5 mm; optionally in the range from 3 to 4 mm; optionally in the range from 3.2 to 3.8 mm; optionally in the range from 3.4 to 3.6 mm; optionally in the range from 3.45 to 3.55 mm;

III) for a glass container having an overflow capacity of more than 50 ml and not more than 100 ml, $s_1 \times r_i \times s_h \times s_{d1/4}$ is in a range from 3 to 5 mm; optionally in the range from 3.1 to 4.5 mm; optionally in the range from 3.2 to 3.8 mm; optionally in the range from 3.3 to 3.5 mm; optionally in the range from 3.35 to 3.45 mm;

$s_{min}$ is in a range 0.9 to 4.5 mm; optionally in the range from 1.2 to 4.2 mm; optionally in the range from 1.49 to 3.75 mm; optionally in the range from 1.65 to 3.0 mm; optionally in the range from 1.77 to 2.25 mm;

$s_{max}$ is in a range from 1.2 to 6 mm; optionally in the range from 1.5 to 5.25 mm; optionally in the range from 1.65 to 4.2 mm; optionally in the range from 1.8 to 3.0 mm; optionally in the range from 1.95 to 2.4 mm;

$s_h$ is in a range from 3 to 5 mm; optionally in the range from 3.2 to 4.5 mm; optionally in the range from 3.5 to 4 mm; optionally in the range from 3.6 to 3.9 mm; optionally in the range from 3.7 to 3.8 mm;

$r_i$ is in a range from 0.4 to 1.2 mm; optionally in the range from 0.5 to 1 mm; optionally in the range from 0.6 to 0.9 mm; optionally in the range from 0.65 to 0.85 mm; optionally in the range from 0.7 to 0.8 mm;

q is in a range from 3.8 to 6 mm; optionally in the range from 4 to 5 mm; optionally in the range from 4.2 to 4.8 mm; optionally in the range from 4.4 to 4.6 mm; optionally in the range from 4.45 to 4.55 mm;

IV) for a glass container having an overflow capacity of more than 100 ml and optionally of less than 200 ml, $s_1 \times r_i \times s_h \times s_{d1/4}$ is in a range from 3 to 5.5 mm; optionally in the range from 3.3 to 4.8 mm; optionally in the range from 3.6 to 4.4 mm; optionally in the range from 3.7 to 4 mm; optionally in the range from 3.8 to 3.9 mm;

$s_{min}$ is in a range 0.9 to 4.5 mm; optionally in the range from 1.2 to 3.75 mm; optionally in the range from 1.49 to 4.2 mm; optionally in the range from 1.65 to 3.0 mm; optionally in the range from 1.77 to 2.25 mm;

$s_{max}$ is in a range from 1.2 to 6 mm; optionally in the range from 1.5 to 5.25 mm; optionally in the range from 1.65 to 4.25 mm; optionally in the range from 1.8 to 3.0 mm; optionally in the range from 1.95 to 2.4 mm;

$s_h$ is in a range from 3 to 6 mm; optionally in the range from 3.5 to 5.5 mm; optionally in the range from 4 to 4.8 mm; optionally in the range from 4.1 to 4.4 mm; optionally in the range from 4.2 to 4.3 mm;

$r_i$ is in a range from 0.4 to 1.2 mm; optionally in the range from 0.5 to 1 mm; optionally in the range from 0.6 to 0.9 mm; optionally in the range from 0.65 to 0.85 mm; optionally in the range from 0.7 to 0.8 mm;

q is in a range from 3 to 8 mm; optionally in the range from 3.5 to 7 mm; optionally in the range from 4 to 6 mm; optionally in the range from 4.5 to 5.5 mm; optionally in the range from 4.75 to 5.35 mm.

In some embodiments of the process provided according to the invention, shaping in process step D) is performed in such a way that, for any cut surface of the glass container that is obtainable by cutting the glass container in a plane that includes the longitudinal axis $L_{tube}$, line $l_1$ is a first line that runs parallel to longitudinal axis $L_{tube}$ and that touches the outer surface of the glass tube and line $l_2$ is a second line that runs parallel to the first line $l_1$ and that passes through the glass bottom at a point $P_3$ which has the largest distance to longitudinal axis $L_{tube}$ from all the points on the outer surface of the glass bottom that, when the glass container is placed on a support, touches the support, and wherein the distance of point $P_3$ to longitudinal axis $L_{tube}$ is x, wherein the following condition is fulfilled: $X>0.7\times d_1/2$, optionally $x>0.72\times d_1/2$, optionally $x>0.74\times d_1/2$, optionally $x>0.76\times d_1/2$ and optionally $x>0.78\times d_1/2$.

In some embodiments of the process provided according to the invention, shaping in process step D) is performed in such a way that the following condition is fulfilled: $s_h^3/(r_o\times s_1)>0.8$ mm; optionally $s_h^3/(r_o\times s_1)>1.0$ mm, optionally $s_h^3/(r_o\times s_1)>1.2$ mm, optionally $s_h^3/(r_o\times s_1)>1.5$ mm and optionally $s_h^3/(r_o\times s_1)>2.0$ mm.

In some embodiments of the process provided according to the invention, shaping in process step D) is performed in such a way that b is >0.5 mm, wherein $r_o$ may be in the range from 0.5 to 4.0 mm, optionally in the range from 1.1 to 3.0 mm, optionally in the range from 1.2 to 2.5 mm, optionally in the range from 1.3 to 2.0 mm and optionally in the range from 1.4 to 1.7 mm.

In some embodiments of the process provided according to the invention, shaping in process step D) is performed in such a way that the following condition is fulfilled: $r_i+s_h-r_o>0$ mm, optionally >0.1 mm, optionally >0.25 mm, optionally >0.5 mm and optionally >0.75 mm.

In some embodiments of the process provided according to the invention, shaping in process step D) is performed in such a way that, the following condition is fulfilled: $s_h>1.05\times s_1$, optionally $>1.15\times s_1$, optionally $>1.25\times s_1$, optionally $>1.4\times s_1$ and optionally $>1.6\times s_1$.

In some embodiments of the process provided according to the invention, the glass container that is formed in process step D) is a packaging container for a medical or a pharmaceutical packaging good or both.

In some embodiments of the process provided according to the invention, the glass container that is formed in process step D) is a vial.

In some embodiments of the process provided according to the invention, the glass of the glass tube provided in process step A) is of a type selected from the group consisting of a borosilicate glass, an aluminosilicate glass, soda lime glass and fused silica.

In some embodiments of the process provided according to the invention, the glass container obtained in process step D) is thermally tempered, chemically tempered or both. Methods for thermally and chemically tempering glass are, for example, disclosed in EP 1 593 658 A1.

In some embodiments provided according to the invention, a glass container is obtainable by a process provided according to the invention, optionally by the previously described process. In some embodiments of the glass container obtainable by this process, the glass container shows the technical features of the glass container provided according to the invention.

In some embodiments provided according to the invention, a process for the preparation of a filled glass container includes:

a) providing a glass container provided according to the invention, optionally the previously described glass container;
b) inserting a liquid pharmaceutical composition into the glass container, wherein the liquid pharmaceutical composition comprises at least one component that increases the friction on glass, optionally a sugar, a salt or a mixture thereof, optionally a sugar selected from the group consisting of sucrose, mannitol or a mixture thereof, wherein the liquid pharmaceutical composition may comprise water in an amount of at least 50 wt.-%, optionally at least 60 wt.-%, optionally at least 70 wt.-% and optionally at least 80 wt.-%, in each case based on the total weight of the liquid pharmaceutical composition, and/or wherein the liquid pharmaceutical composition comprises a sugar selected from the group consisting of sucrose, mannitol or a mixture thereof in an amount of at least 1 wt.-%, optionally at least 5 wt.-%, optionally at least 10 wt.-%, optionally at least 15 wt.-% and optionally at least 20 wt.-%, in each case based on the total weight of the liquid pharmaceutical composition;
c) freezing the liquid pharmaceutical composition contained in the glass container.

In some embodiments of the process, the liquid pharmaceutical composition that in process step b) is inserted into the glass container is an mRNA-vaccine.

In some embodiments of the process, freezing in process step b) is accomplished by placing the filled glass container on a shelf inside a lyophilization chamber and passing a refrigerant, optionally liquid nitrogen, through cavities in the shelf.

In some embodiments of the process, in process step b) the filled container is cooled until the pharmaceutical composition comprised therein reaches a temperature of −20° C. or less, optionally of −30° C. or less, optionally of −40° C. or less, optionally of −50° C. or less, optionally of −60° C. or less, optionally of −70° C. or less and optionally of −80° C. or less.

In some embodiments of the process, the frozen pharmaceutical composition is subjected to freeze-drying.

In some embodiments of the process, freeze-drying is accomplished by reducing the pressure in the glass container containing the frozen pharmaceutical composition any by adding heat to the frozen pharmaceutical composition in order for the water to at least partially sublimate.

In some embodiments of the process, freeze-drying comprises two steps of water sublimation, a first step in which water is removed by sublimation at a temperature in the range from −10 to −40° C., optionally in the range from −15 to −35° C. and optionally in a range from −20 to −30° C. and/or at a pressure in the range from 1 to 1000 Pascal, optionally in a range from 2 to 100 Pascal and optionally in a range from 4 to 20 Pascal and a second step in which unfrozen water that did not crystallize during freezing is desorbed at a temperature in the range from 10 to 40° C., optionally in a range from 15 to 35° C. and optionally in a range from 20 to 30° C.

In some exemplary embodiments provided according to the invention, a use of the glass container provided according to the invention, optionally the previously described glass container, for packaging a pharmaceutical composition is provided.

In some embodiments of the use, the pharmaceutical composition is obtained by freezing or freeze-drying a liquid pharmaceutical composition within the glass container.

In some embodiments of the use, the liquid composition comprises at least one component that increases the friction on glass, optionally a sugar, a salt or a mixture thereof, optionally a sugar selected from the group consisting of sucrose, mannitol or a mixture thereof, wherein the liquid pharmaceutical composition may comprise water in an amount of at least 50 wt.-%, optionally at least 60 wt.-%, optionally at least 70 wt.-% and optionally at least 80 wt.-%, in each case based on the total weight of the liquid composition, and/or wherein the liquid composition comprises a sugar selected from the group consisting of sucrose, mannitol or a mixture thereof, optionally in an amount of at least 1 wt.-%, optionally at least 5 wt.-%, optionally at least 10 wt.-%, optionally at least 15 wt.-% and optionally at least 20 wt.-%, in each case based on the total weight of the liquid composition.

In some embodiments of the use, the liquid composition is an mRNA-vaccine.

Glass Container

The glass container provided according to the invention may have any size or shape which the skilled person deems appropriate in the context of the invention. Optionally, the head region of the glass container comprises an opening, which allows for inserting a pharmaceutical composition into the interior volume of the glass container. The glass container comprises as container parts a glass tube with a first end and a further end, a glass bottom that closes the glass tube at the first end and a curved glass heel extending from an outer area of the glass bottom to the first end of the glass tube. Optionally, the glass container is of a one-piece design that is prepared by providing a glass tube, optionally in form of a hollow cylinder, forming the glass bottom of the glass container and a curved glass heel via which the glass bottom is connected to the glass tube, thereby closing the glass tube at this end. An exemplary glass container is a pharmaceutical glass container, optionally one selected from the group consisting of a vial, an ampoule or a combination thereof.

For the use in this document, the interior volume $V_i$ (also referred to as the overflow capacity) represents the maximum volume of liquid that the glass container can hold if filled to the point of overflowing. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may, for example, be less than the interior volume by a factor of about 0.5.

Glass

The glass of the container may be any type of glass and may consist of any material or combination of materials which the skilled person deems suitable in the context of the invention. Optionally, the glass is suitable for pharmaceutical packaging. In some embodiments, the glass is of type I, optionally type I b, in accordance with the definitions of glass types in section 3.2.1 of the European Pharmacopoeia, $7^{th}$ edition from 2011. Additionally, or alternatively, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, optionally more than 9 wt.-%, for example in a range from 9 to 20 wt.-%, in each case based on the total weight of the glass. An exemplary aluminosilicate glass has a content of $B_2O_3$ of less than 8 wt.-%, optionally at maximum 7 wt.-%, optionally in a range from 0 to 7 wt.-%, in each case based on the total weight of the glass. For the use in this document, a borosilicate glass is a glass which has a content of $B_2O_3$ of at least 1 wt.-%, optionally at least 2 wt.-%, optionally at least 3 wt.-%, optionally at least 4 wt.-%, optionally at least 5 wt.-%, for example in a range from 5 to 15 wt.-%, in each case based on the total weight of the glass. An exemplary borosilicate glass has a content of $Al_2O_3$ of less than 7.5 wt.-%, optionally less than 6.5 wt.-%, optionally in a range from 0 to 5.5 wt.-%, in each case based on the total weight of the glass. In a further aspect, the borosilicate glass has a content of $Al_2O_3$ in a range from 3 to 7.5 wt.-%, optionally in a range from 4 to 6 wt.-%, in each case based on the total weight of the glass.

A glass provided according to the invention may be essentially free from B. Therein, the wording "essentially free from B" refers to glasses which are free from B which has been added to the glass composition by purpose. This means that B may still be present as an impurity, but optionally at a proportion of not more than 0.1 wt.-%, optionally not more than 0.05 wt.-%, in each case based on the weight of the glass.

Pharmaceutical Composition

In the context of the invention, every pharmaceutical composition which the skilled person deems suitable comes into consideration. A pharmaceutical composition is a composition comprising at least one active ingredient. An exemplary active ingredient is a vaccine. The pharmaceutical composition may be liquid or solid or both. An exemplary solid composition is granular such as a powder, a multitude of tablets or a multitude of capsules. A further exemplary pharmaceutical composition is a parenterialium, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter. A pharmaceutical composition that may be filled into the glass container provided according to the present invention is liquid pharmaceutical composition, optionally a liquid aqueous pharmaceutical composition that comprises at least one component that increases the friction on glass, optionally a sugar, a salt or a mixture thereof, optionally a sugar selected from the group consisting of sucrose, mannitol or a mixture thereof, wherein the liquid pharmaceutical composition may comprise water in an amount of at least 50 wt.-%, optionally at least 60 wt.-%, optionally at least 70 wt.-% and optionally at least 80 wt.-%, in each case based on the total weight of the liquid pharmaceutical composition, and/or wherein the liquid pharmaceutical composition comprises a sugar selected from the group consisting of sucrose, mannitol or a mixture thereof, optionally in an amount of at least 1 wt.-%, optionally at least 5 wt.-%, optionally at least 10 wt.-%, optionally at least 15 wt.-%, and optionally at least 20 wt.-%, in each case based on the total weight of the liquid pharmaceutical composition. An example of such a liquid pharmaceutical composition is an mRNA-vaccine.

In some embodiments of the glass container provided according to the present invention the glass container is a vial with an overflow capacity equal to or larger than 1 ml up to maximal 5 ml, optionally a vial with a size designation "2R" according to DIN EN ISO 8362-1:2016-06, wherein optionally at least one, optionally all, of the following conditions i) to v) is/are fulfilled:

i) $s_1$ is in a range from 1.0 to 2.5 mm, optionally in the range from 1.05 to 2.0 mm, optionally in the range from 1.1 to 1.5 mm, optionally in the range from 1.10 to 1.4 mm, optionally in the range from 1.15 to 1.25 mm;
ii) $s_{d1/4}$ is in a range from 0.7 to 2 mm, optionally in the range from 0.9 to 1.8 mm, optionally in the range from 1.1 to 1.4 mm, optionally in the range from 1.15 to 1.35 mm, optionally in the range from 1.2 to 1.3 mm;
iii) $s_h$ is in a range from 0.9 to 1.5 mm, optionally in the range from 1 to 1.4 mm, optionally in the range from 1.05 to 1.3 mm, optionally in the range from 1.1 to 1.25 mm, optionally in the range from 1.15 to 1.2 mm;
iv) $r_i$ is in a range from 0.2 to 0.8 mm, optionally in the range from 0.25 to 0.7 mm, optionally in the range from 0.3 to 0.6 mm, optionally in the range from 0.35 to 0.55 mm, optionally in the range from 0.4 to 0.5 mm;
v) q is in a range from 1.2 to 2 mm, optionally in the range from 1.3 to 1.9 mm, optionally in the range from 1.4 to 1.8 mm, optionally in the range from 1.5 to 1.7 mm, optionally in the range from 1.55 to 1.65 mm.

In some embodiments of the glass container provided according to the present invention the glass container is a vial with an overflow capacity of larger than 4 ml up to maximal 8 ml, optionally a vial with a size designation "4R" according to DIN EN ISO 8362-1:2016-06, wherein optionally at least one, optionally all, of the following conditions i) to v) is/are fulfilled:

i) $s_1$ is in a range from 1.0 to 2.5 mm, optionally in the range from 1.05 to 2.0 mm, optionally in the range from 1.1 to 1.5 mm, optionally in the range from 1.10 to 1.4 mm, optionally in the range from 1.15 to 1.25 mm;
ii) $s_{d1/4}$ is in a range from 0.7 to 2 mm, optionally in the range from 0.9 to 1.8 mm, optionally in the range from 1.1 to 1.4 mm, optionally in the range from 1.15 to 1.35 mm, optionally in the range from 1.2 to 1.3 mm;
iii) $s_h$ is in a range from 0.9 to 1.5 mm, optionally in the range from 1 to 1.4 mm, optionally in the range from 1.05 to 1.3 mm, optionally in the range from 1.1 to 1.25 mm, optionally in the range from 1.15 to 1.2 mm;
iv) $r_i$ is in a range from 0.2 to 0.8 mm, optionally in the range from 0.25 to 0.7 mm, optionally in the range from 0.3 to 0.6 mm, optionally in the range from 0.35 to 0.55 mm, optionally in the range from 0.4 to 0.5 mm;
v) q is in a range from 1.2 to 2 mm, optionally in the range from 1.3 to 1.9 mm, optionally in the range from 1.4 to 1.8 mm, optionally in the range from 1.5 to 1.7 mm, optionally in the range from 1.55 to 1.65 mm.

In some embodiments of the glass container provided according to the present invention the glass container is a vial with an overflow capacity of larger than 8 ml up to maximal 10.75 ml, optionally a vial with a size designation "6R" according to DIN EN ISO 8362-1:2016-06, wherein it optionally at least one, optionally all, of the following conditions i) to v) is/are fulfilled:

i) $s_1$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;
ii) $s_{d1/4}$ is in a range from 1.8 to 2.7 mm, optionally in the range from 1.9 to 2.6 mm, optionally in the range from 2 to 2.5 mm, optionally in the range from 2.1 to 2.4 mm, optionally in the range from 2.15 to 2.35 mm;
iii) $s_h$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm.

In some embodiments of the glass container provided according to the present invention the glass container is a vial with an overflow capacity of larger than 10.75 ml up to maximal 12.5 ml, optionally a vial with a size designation "8R" according to DIN EN ISO 8362-1:2016-06, wherein optionally at least one, optionally all, of the following conditions i) to v) is/are fulfilled:

i) $s_1$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

ii) $s_{d1/4}$ is in a range from 1.8 to 2.7 mm, optionally in the range from 1.9 to 2.6 mm, optionally in the range from 2 to 2.5 mm, optionally in the range from 2.1 to 2.4 mm, optionally in the range from 2.15 to 2.35 mm;

iii) $s_h$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm.

In some embodiments of the glass container provided according to the present invention the glass container is a vial with an overflow capacity of larger than 12.5 ml up to maximal 16.25 ml, optionally a vial with a size designation "10R" according to DIN EN ISO 8362-1:2016-06, wherein optionally at least one, optionally all, of the following conditions i) to v) is/are fulfilled:

i) $s_1$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

ii) $s_{d1/4}$ is in a range from 1.8 to 2.7 mm, optionally in the range from 1.9 to 2.6 mm, optionally in the range from 2 to 2.5 mm, optionally in the range from 2.1 to 2.4 mm, optionally in the range from 2.15 to 2.35 mm;

iii) $s_h$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm.

In some embodiments of the glass container provided according to the present invention the glass container is a vial with an overflow capacity of larger than 16.25 ml up to maximal 22.5 ml, optionally a vial with a size designation "15R" according to DIN EN ISO 8362-1:2016-06, wherein optionally at least one, optionally all, of the following conditions i) to v) is/are fulfilled:

i) $s_1$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

ii) $s_{d1/4}$ is in a range from 1.8 to 2.7 mm, optionally in the range from 1.9 to 2.6 mm, optionally in the range from 2 to 2.5 mm, optionally in the range from 2.1 to 2.4 mm, optionally in the range from 2.15 to 2.35 mm;

iii) $s_h$ is in a range from 1.9 to 3.1 mm, optionally in the range from 2.1 to 2.9 mm, optionally in the range from 2.3 to 2.7 mm, optionally in the range from 2.4 to 2.6 mm, optionally in the range from 2.45 to 2.55 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm.

In some embodiments of the glass container provided according to the present invention the glass container is a vial with an overflow capacity of larger than 22.5 ml up to maximal 29.25 ml, optionally a vial with a size designation "20R" according to DIN EN ISO 8362-1:2016-06, wherein optionally at least one, optionally all, of the following conditions i) to v) is/are fulfilled:

i) $s_1$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

ii) $s_{d1/4}$ is in a range from 2.1 to 4 mm, optionally in the range from 2.3 to 3.5 mm, optionally in the range from 2.5 to 2.9 mm, optionally in the range from 2.6 to 2.8 mm, optionally in the range from 2.65 to 2.75 mm;

iii) $s_h$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 2.8 to 5 mm, optionally in the range from 3 to 4 mm, optionally in the range from 3.2 to 3.8 mm, optionally in the range from 3.4 to 3.6 mm, optionally in the range from 3.45 to 3.55 mm.

In some embodiments of the glass container provided according to the present invention the glass container is a vial with an overflow capacity of larger than 29.25 ml up to maximal 35 ml, optionally a vial with a size designation "25R" according to DIN EN ISO 8362-1:2016-06, wherein optionally at least one, optionally all, of the following conditions i) to v) is/are fulfilled:

i) $s_1$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

ii) $s_{d1/4}$ is in a range from 2.1 to 4 mm, optionally in the range from 2.3 to 3.5 mm, optionally in the range from 2.5 to 2.9 mm, optionally in the range from 2.6 to 2.8 mm, optionally in the range from 2.65 to 2.75 mm;

iii) $s_h$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 2.8 to 5 mm, optionally in the range from 3 to 4 mm, optionally in the range from 3.2 to 3.8 mm, optionally in the range from 3.4 to 3.6 mm, optionally in the range from 3.45 to 3.55 mm.

In some embodiments of the glass container provided according to the present invention the glass container is a vial with an overflow capacity of larger than 35 ml up to maximal 49.75 ml, optionally a vial with a size designation "30R" according to DIN EN ISO 8362-1:2016-06, wherein optionally at least one, optionally all, of the following conditions i) to v) is/are fulfilled:

i) $s_1$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

ii) $s_{d1/4}$ is in a range from 2.1 to 4 mm, optionally in the range from 2.3 to 3.5 mm, optionally in the range from 2.5 to 2.9 mm, optionally in the range from 2.6 to 2.8 mm, optionally in the range from 2.65 to 2.75 mm;

iii) $s_h$ is in a range from 1.9 to 5 mm, optionally in the range from 2.2 to 4 mm, optionally in the range from 2.5 to 3.7 mm, optionally in the range from 2.7 to 3.3 mm, optionally in the range from 2.9 to 3.1 mm;

iv) $r_i$ is in a range from 0.25 to 0.9 mm, optionally in the range from 0.3 to 0.8 mm, optionally in the range from 0.35 to 0.7 mm, optionally in the range from 0.4 to 0.6 mm, optionally in the range from 0.45 to 0.55 mm;

v) q is in a range from 2.8 to 5 mm, optionally in the range from 3 to 4 mm, optionally in the range from 3.2 to 3.8 mm, optionally in the range from 3.4 to 3.6 mm, optionally in the range from 3.45 to 3.55 mm.

In some embodiments of the glass container provided according to the present invention the glass container is a vial with an overflow capacity of larger than 49.75 ml up to maximal 92.5 ml, optionally a vial with a size designation "50R" according to DIN EN ISO 8362-1:2016-06, wherein optionally at least one, optionally all, of the following conditions i) to v) is/are fulfilled:

i) $s_1$ is in a range from 3 to 5 mm, optionally in the range from 3.2 to 4.5 mm, optionally in the range from 3.5 to 4 mm, optionally in the range from 3.6 to 3.9 mm, optionally in the range from 3.7 to 3.8 mm;

ii) $s_{d1/4}$ is in a range from 3 to 5 mm, optionally in the range from 3.1 to 4.5 mm, optionally in the range from 3.2 to 3.8 mm, optionally in the range from 3.3 to 3.5 mm, optionally in the range from 3.35 to 3.45 mm;

iii) $s_h$ is in a range from 3 to 5 mm, optionally in the range from 3.2 to 4.5 mm, optionally in the range from 3.5 to 4 mm, optionally in the range from 3.6 to 3.9 mm, optionally in the range from 3.7 to 3.8 mm;

iv) $r_i$ is in a range from 0.4 to 1.2 mm, optionally in the range from 0.5 to 1 mm, optionally in the range from 0.6 to 0.9 mm, optionally in the range from 0.65 to 0.85 mm, optionally in the range from 0.7 to 0.8 mm;

v) q is in a range from 3.8 to 6 mm, optionally in the range from 4 to 5 mm, optionally in the range from 4.2 to 4.8 mm, optionally in the range from 4.4 to 4.6 mm, optionally in the range from 4.45 to 4.55 mm.

In some embodiments of the glass container provided according to the present invention the glass container is a vial with an overflow capacity of larger than 92.5 ml up to maximal 150 ml, optionally a vial with a size designation "100R" according to DIN EN ISO 8362-1:2016-06, wherein optionally at least one, optionally all, of the following conditions i) to v) is/are fulfilled:

i) $s_1$ is in a range from 3 to 6 mm, optionally in the range from 3.5 to 5.5 mm, optionally in the range from 4 to 4.8 mm, optionally in the range from 4.1 to 4.4 mm, optionally in the range from 4.2 to 4.3 mm;

ii) $s_{d1/4}$ is in a range from 3 to 5.5 mm, optionally in the range from 3.3 to 4.8 mm, optionally in the range from 3.6 to 4.4 mm, optionally in the range from 3.7 to 4 mm, optionally in the range from 3.8 to 3.9 mm;

iii) $s_h$ is in a range from 3 to 6 mm, optionally in the range from 3.5 to 5.5 mm, optionally in the range from 4 to 4.8 mm, optionally in the range from 4.1 to 4.4 mm, optionally in the range from 4.2 to 4.3 mm;

iv) $r_i$ is in a range from 0.4 to 1.2 mm, optionally in the range from 0.5 to 1 mm, optionally in the range from 0.6 to 0.9 mm, optionally in the range from 0.65 to 0.85 mm, optionally in the range from 0.7 to 0.8 mm;

v) q is in a range from 3 to 8 mm, optionally in the range from 3.5 to 7 mm, optionally in the range from 4 to 6 mm, optionally in the range from 4.5 to 5.5 mm, optionally in the range from 4.75 to 5.35 mm.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Determination of $r_i$, $r_o$ and $s_h$

The inner diameter $r_i$, the outer diameter $r_o$ and the thickness of the glass of the curved glass heel $s_h$ can be determined in a non-destructive manner using a profile projector. This approach may be particularly suitable for glass containers that have been chemically and/or thermally tempered and that therefore cannot be easily sliced in half without the glass cracking or bursting. For determining $r_i$, $r_o$ and $d_h$ in a non-destructive manner, radius templates are used that are commercially available, for example, from Mitutoyo Deutschland GmbH, Neuss, Germany. These templates are printed on a transparent foil which, after applying a line that indicates the ground-level bearing surface and a tangent that confines an angle of 45° with the ground-level bearing surface, is glued to the ground glass of a Mitutoyo PJ-3000 profile projector. The profile projector has a 10× magnification and is operated with transmitted light illumination. The vials are placed in Hallbrite® BHB (a butyloctyl salicylate obtainable from the Hallstar Company, Chicago, USA), which is filled into a glass bowl. Hallbrite® BHB is used to visualize the inner contour of the vial. It is ensured that the cross-section of the glass container that is inspected in the profile projector corresponds to the plane that is centrically located in the glass container and that comprises the longitudinal axis of the glass container, i. e. the axis that goes perpendicular through the center of the bottom (see FIGS. 2A and 2B).

Figure 2A:
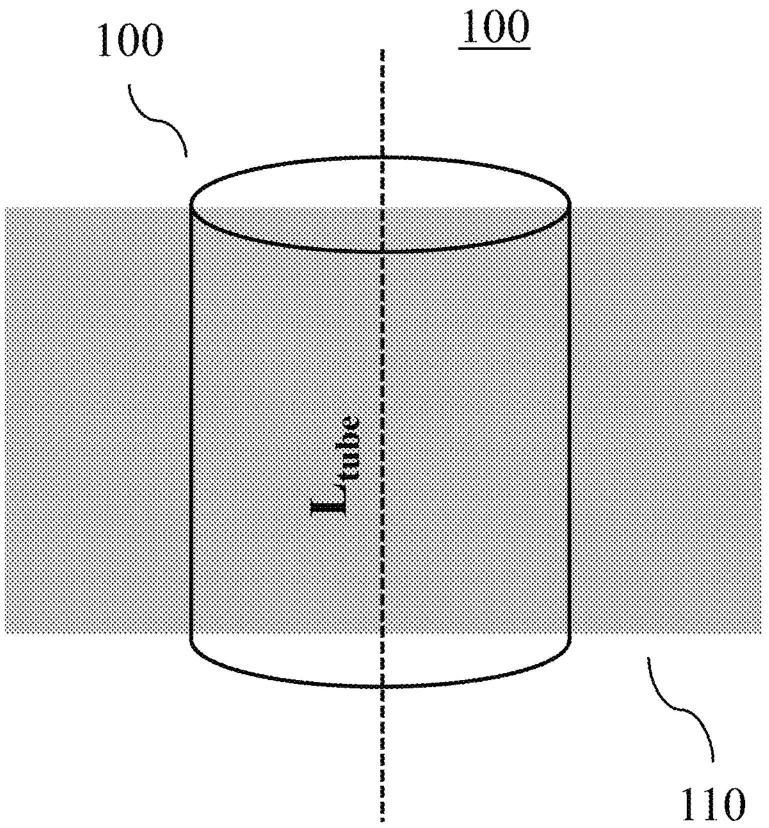
FIG. 2A illustrates a top view of localization of a plane that is used to determine $s_{d1/4}$, $r_o$, $r_i$ and $s_h$.
Figure 2B:
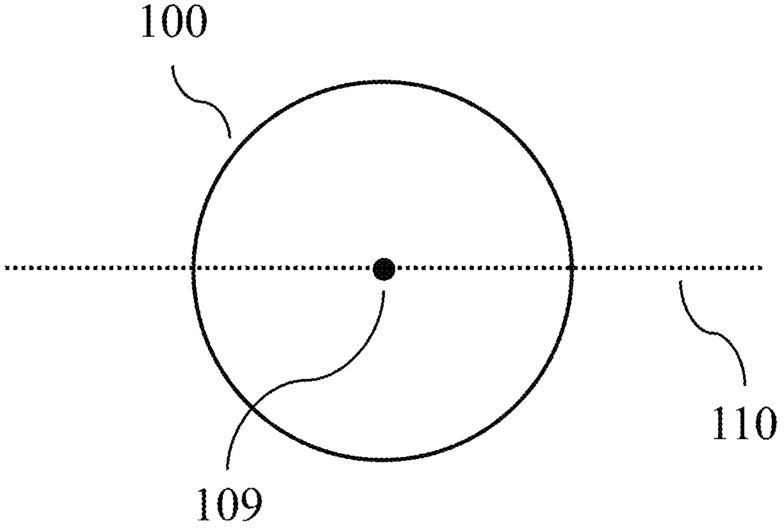
FIG. 2B illustrates a top view of localization of a plane that is used to determine $s_{d1/4}$, $r_o$, $r_i$ and $s_h$.

To improve the measuring accuracy, $r_i$, $r_o$ and $s_h$ can also be determined from a physical cross-sectional cut parallel along to the longitudinal axis of the container (it is again ensured that the cross-section of the glass container corresponds to the plane that is centrically located in the glass container and that comprises the longitudinal axis as shown in FIGS. 2A and 2B). For preparation without breakage, the container may be embedded into transparent 2-component epoxy resin, for example STRUERS GmbH, EpoFix Resin, or other suitable materials. After curing of the epoxy resin, a cross-sectional cut parallel along to the container axis can be achieved by machine-supported sawing, grinding and polishing. Geometrical features of the container can then be determined (measured) by non-distorting image capturing and geometrical analysis software tools.

Figure 4A:
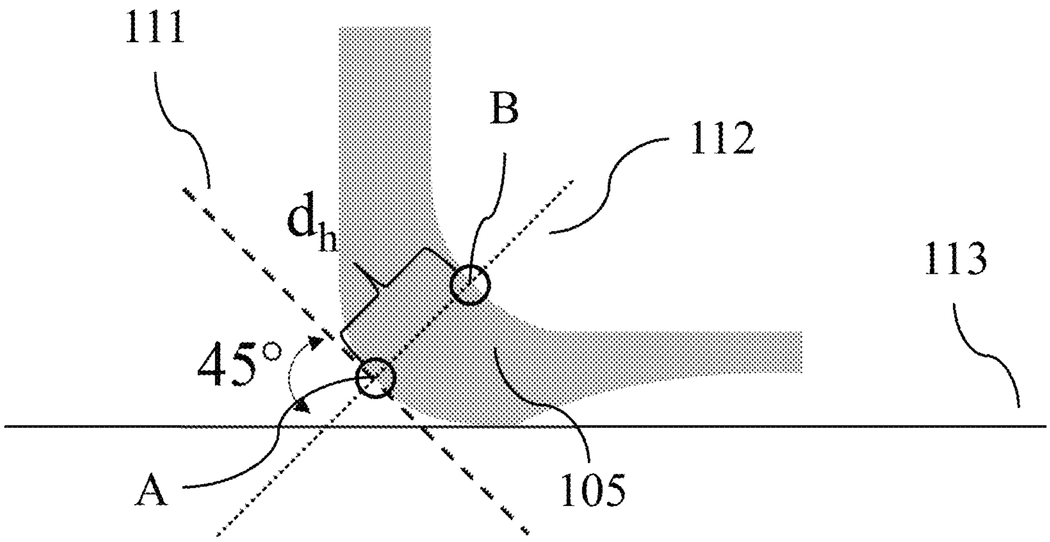
FIG. 4A illustrates the determination of $s_h$ in a curved glass heel.

In the cross-sectional plane of the glass container that is evaluated by the two approaches described above $r_i$, $r_o$ and $s_h$ can be determined as follows, optionally is determined as follows:

For the determination of $s_h$ a tangent that confines an angle of 45° with the ground-level bearing surface (i. e. the surface that comes into contact with the exterior side of the container bottom if the container is placed upright) is placed at the exterior surface of the curved glass heel as shown in FIG. 4A (the dashed line indicates the 45°-tangent). The point of the exterior surface of the curved glass heel that comes into contact with the 45-tangent is designated as "A" (see FIG. 4A). Next, a straight line orthogonal to 45°-tangent is guided through point "A" (the dotted line in FIG. 4A indicates the orthogonal line). The position at which this straight orthogonal line breaks through the interior side of the curved glass heel is designated as "B" (see FIG. 4A). $s_h$ corresponds to the distance between points "A" and "B".

If there are more than only one point of exterior surface of the curved glass heel that comes into contact with the 45-tangent (as shown, for example, in FIG. 4B), point "A" corresponds to the point that is nearest to the outer surface of the glass tube. However, according to some embodiments of the glass container provided according to the invention the curved glass heel has a shape such that, when placing the 45°-tangent to the exterior surface of the curved glass heel, there is only one point of exterior surface of the curved glass heel that comes into contact with the 45-tangent.

Figure 5A:
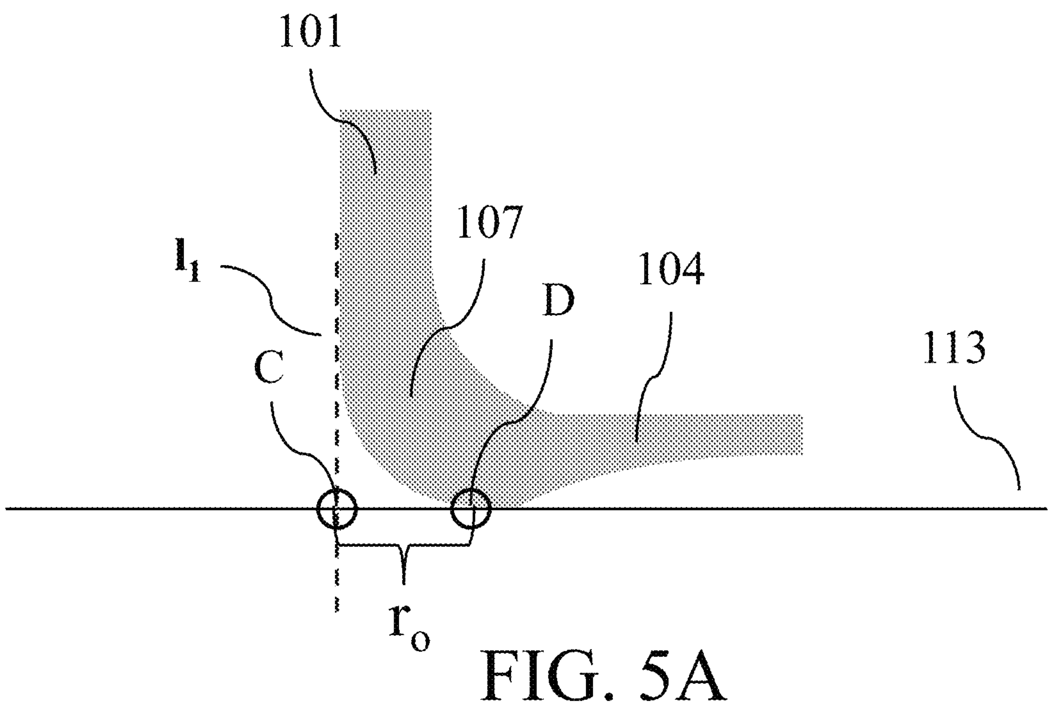
FIG. 5A illustrates the determination of $r_o$ in a curved glass heel.

For the determination of $r_o$ the intersection point of a first straight line that forms an elongation of the exterior side of the glass tube and the ground-level bearing surface is determined (see the vertical dashed line in FIG. 5A). If the curved glass heel laterally extends over the first straight line that forms an elongation of the exterior side, the first line goes through the curved glass heel until it reaches the ground-level bearing surface. The intersection point is designated as "C". Next, the point of the exterior surface of the glass container that contacts the ground-level bearing surface and that is closest to point "C" is determined. This intersection point is designated as "D" (see FIG. 5A). $r_o$ corresponds to the distance between points "C" and "D". In case of a curved glass heel having a circular arc $l_o$ at the outer surface of the curved glass heel with a length of $2\times\pi\times r_o/4$, the distance between points "C" and "D" corresponds to the radius $r_o$ of the circle that is defined by the shape of the outer surface of the curved glass heel. However, the glass container provided according to the present invention is not limited to glass containers in which the circular arc $l_o$ at the outer surface of the curved glass heel has a length of $(90°/360°)\times 2\pi\times r_o$, but also comprises glass containers in which this circular arc $l_o$ is smaller or glass containers in which the outer surface of the curved glass heel is not shaped in the form of a circular arc at all. In these cases, $r_o$ actually does not correspond to the outer radius of the curved glass heel, but to width of the glass overhang in the area of the curved glass heel that is defined by the distance between points "C" and "D".

Figure 5B:
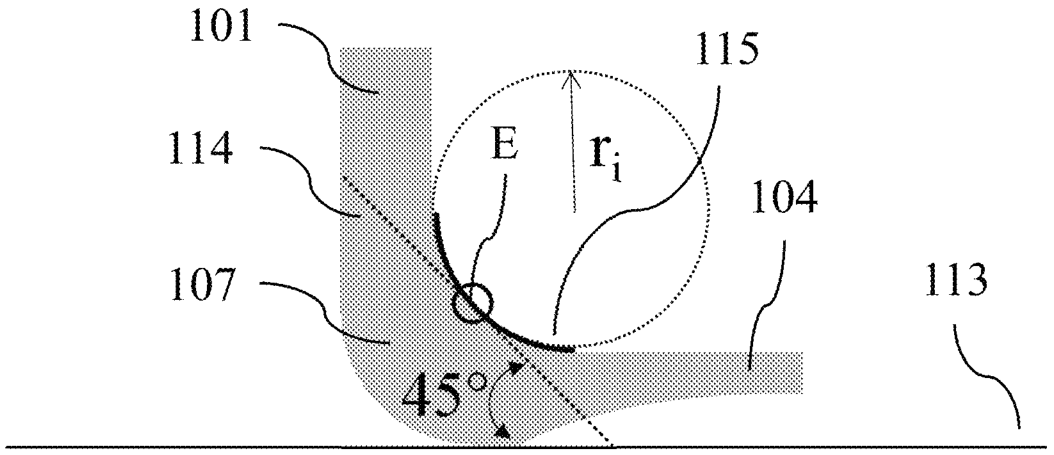
FIG. 5B illustrates the determination of $r_i$ in a curved glass heel.

For the determination of $r_i$ a tangent that confines an angle of 45° with the ground-level bearing surface is placed at the interior surface of the curved glass heel as shown in FIG. 5B (the dashed line indicates the 45°-tangent). The point of the interior surface of the curved glass heel that comes into contact with the 45-tangent is designated as "E" (see FIG. 5B). Next, the largest quarter circle is determined that can be properly positioned on the inner contour of the curved glass heel, that comprises point "E" in the middle of the quarter circle and the ends of which do not extending into the mass of glass. $r_i$ corresponds to the radius of the largest quarter circles.

If there are more than only one point of interior surface of the curved glass heel that comes into contact with the 45°-tangent, point "E" corresponds to the geometric center between points "X1" and "X2", wherein point "X1" is the point on the 45°-tangent that comes into contact with the interior surface of the curved glass heel and that is located nearest to the glass tube and point "X2" is the point on the 45°-tangent that comes into contact with the interior surface of the curved glass heel and that is located nearest to the glass bottom. However, according to some embodiments of the glass container provided according to the invention the curved glass heel has a shape such that, when placing the 45°-tangent to the interior surface of the curved glass heel, there is only one point of interior surface of the curved glass heel that comes into contact with the 45-tangent.

Thickness $s_1$, $s_{min}$, $s_{max}$ and $s_{d1/4}$ at Distance $d_1/4$, Tolerance of Wall Thickness and Distance q The wall thickness $s_1$, thicknesses $s_{min}$, $s_{max}$ and $s_{d1/4}$ at distance $d_1/4$ of the circular glass bottom, the heel overhang q and deviations from the mean value of the wall thickness (tolerance) can be determined using a profile projector or they can be determined from a physical cross-sectional cut parallel along to the longitudinal axis of the container as described above in connection with the determination of $r_i$, $r_o$ and $s_h$.

EXAMPLES

A glass tube having an outer diameter of 16 mm and a wall thickness $s_1$ (as indicated in Table 1 below) made of borosilicate glass is loaded into the head of a rotary machine. While rotating around its major axis the glass tube is heated to its softening point with separation gas burners as shown in FIG. 1 and the heated glass is pulled along its major axis by moving the clamping chucks creating two separate portions of glass tube and forming a closed bottom at the upper end of the lower portion. Consecutively, the closed bottom is heated with gas burners to the glass transition temperature and brought into contact with a carbon mold matrix as further depicted in FIG. 8. When bringing the mold matrix into contact with the closed bottom, the distance is decreased stepwise in a first and second step. The ratio of the distance decreased in the first step to the distance decreased in the second step ($Y^1_m/Y^2_m$; see FIG. 9) was 30. Furthermore, the second step was performed with a time delay (Δt) of 1.5 sec after the first step. By use of the mold matrix the container closure is shaped to form a glass bottom and a curved glass heel via which the glass bottom is connected to the glass tube, thereby adjusting the parameters $s_{d1/4}$, $s_{min}$, $s_{max}$, $r_i$ and q to the values indicated in Table 1.

By use of the above-described process, glass containers with a size designation “2R” according to DIN EN ISO 8362-1:2016-06 have been obtained which are characterized by a thickness of the circular glass bottom that meet the requirements defined in the claims. For the preparation of the comparative glass container, the above-described two-step process was not performed. Here, the carbon mold matrix was brought into contact with the closed bottom in a single step.

TABLE 1

| Glass container | $s_1$ [mm] | $s_{d1/4}$ [mm] | $s_{min}$ [mm] | $s_{max}$ [mm] | $r_i$ [mm] | q [mm] |
|---|---|---|---|---|---|---|
| Comparative Example | 1.0 | 0.97 | 0.95 | 1.0 | 0.29 | 1.23 |
| Example | 1.2 | 1.4 | 1.25 | 1.4 | 0.44 | 1.6 |

Evaluation

Figure 10:
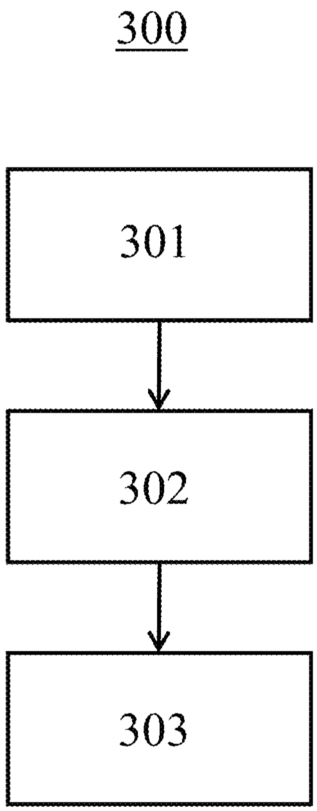
FIG. 10 illustrates a flow chart of a process provided according to the invention for packaging a pharmaceutical composition.
Figure 12:
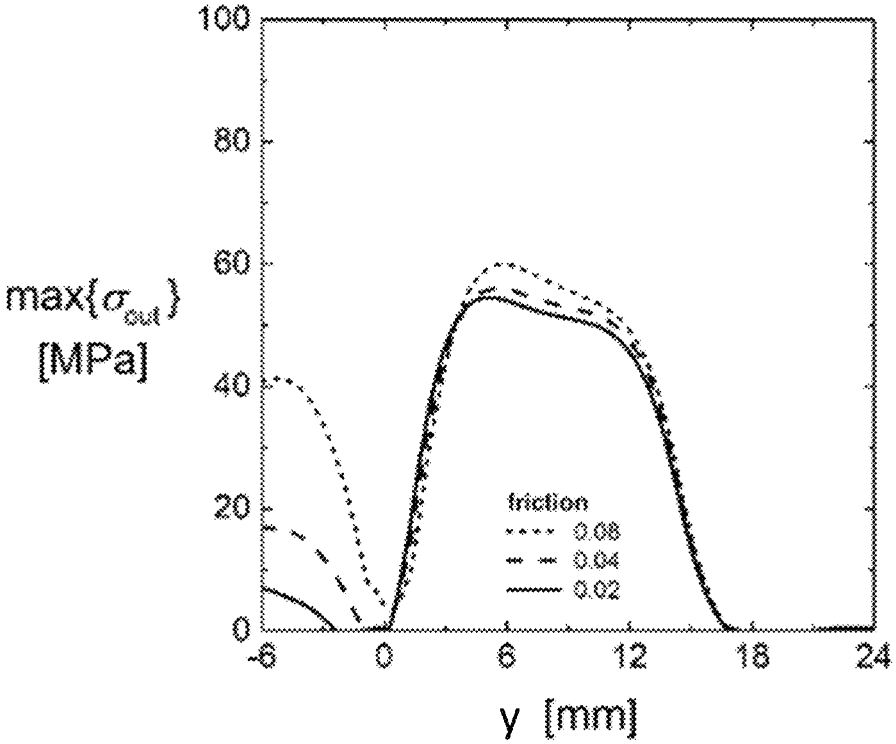
FIG. 12 illustrates the calculated maximum principal stress max {σout} versus the path position y for a glass vial known from the prior art.
Figure 13:
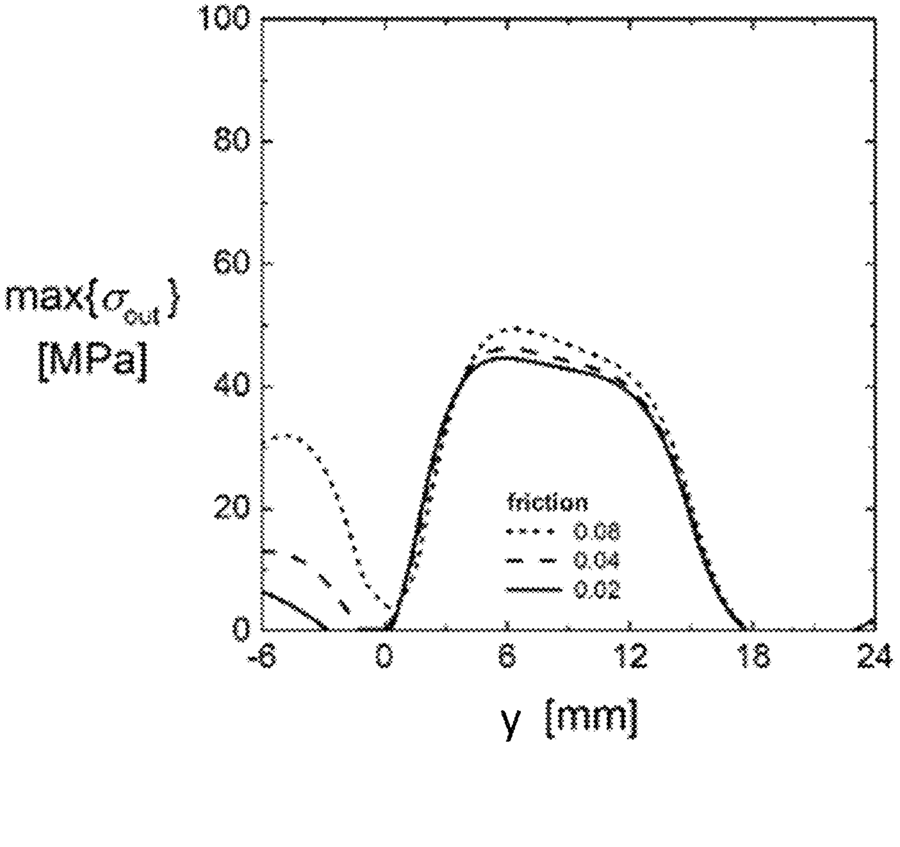
FIG. 13 illustrates the calculated maximum principal stress max {σout} versus the path position y for a glass vial provided according to the present invention.

From the thus obtained glass containers the tensile stresses (in MPa) on the outside of the container are calculated. The results are shown in FIGS. 12 and 13. Values y on the x-axis in these FIGS. corresponds to the distance from the center 109 of the circular glass bottom 104, as determined on the outside of the glass container. As shown in FIG. 10, values in section a) relate to a position on the outside of the cylindrical part of the glass tube 101, whereas values in section b) relate to a position on the outer surface within the curved glass heel 107 and the circular glass bottom 104 (with y=0 at the first end 102 of the tube 101). Negative values for y define positions on the outside of the curved glass heel 107 up to a position on the outside of the center 109 of the circular glass bottom 104.

Important is the expression of the tensile stress maximum at y<0 mm (i.e., in the heel/bottom region). It has been observed that a maximum occurs approx. in the middle of the bottom, i. e. at a position having a distance of about $d_1/4$ from longitudinal axis $L_{tube}$, which is hardly pronounced for friction value of 0.02 (corresponds to water without sugar or similar), but becomes clearly pronounced towards friction values of 0.08 (which correspond to sucrose-containing aqueous solution). At a friction value of 0.08, a tensile stress maximum of 41 MPa (at position y=−5.26 mm) is reached in the calculated Comparative Example (corresponds to a glass container known from the prior art), whereas in the inventive Example the tensile stress maximum is reduced to 32 MPa (at y=−4.86 mm). This significantly reduces the risk of breakage in the bottom area if, for example, sucrose-containing aqueous solution are frozen within the glass container.

Referring further now to the drawings, FIG. 1 shows a cross-sectional view of a glass container 100 provided according to the invention. For the purpose of an improved illustration the individual parts of the glass container (i. e. glass tube 101, glass bottom 104 and curved glass heel 107) have been separated from each other. However, as the glass container 100 provided according to the invention is optionally obtained by a process in which a mother tube (which forms glass tube 101), while rotating around its major axis, is heated to its softening point with flames, in which the heated glass is pulled along its major axis for stretching and creating a container closure and in which the container closure has been shaped to form a glass bottom 104 and a curved glass heel 107, these parts are integrally connected in the glass container 100 provided according to the present invention. As shown in FIG. 1, the glass tube 101 is characterized by a first end 102 and a further end 103. The glass bottom 104 comprises an inner surface 105, an outer surface 106 and an outer region 108 that in the glass container 100 is connected to the curved glass heel 107. The glass tube 101 is characterized by a longitudinal axis $L_{tube}$ and a wall thickness $s_1$. The thickness of the glass bottom 104 at its center 109 is $s_{cgb}$.

FIGS. 2A and 2B show in a side view and in a top view the localization of plane 110 in the glass container 100 that is used to determine parameters such as $s_{d1/4}$, $r_o$, $s_{min}$, $s_{max}$ and $s_h$. Plane 110 corresponds to the plane that is centrically located in the glass container 100 and that comprises the longitudinal axis $L_{tube}$ of the glass container (indicated by the dashed line in FIG. 2A), i.e. the axis that goes perpendicular through the center of the bottom 109 (see FIG. 2B).

Figure 3:
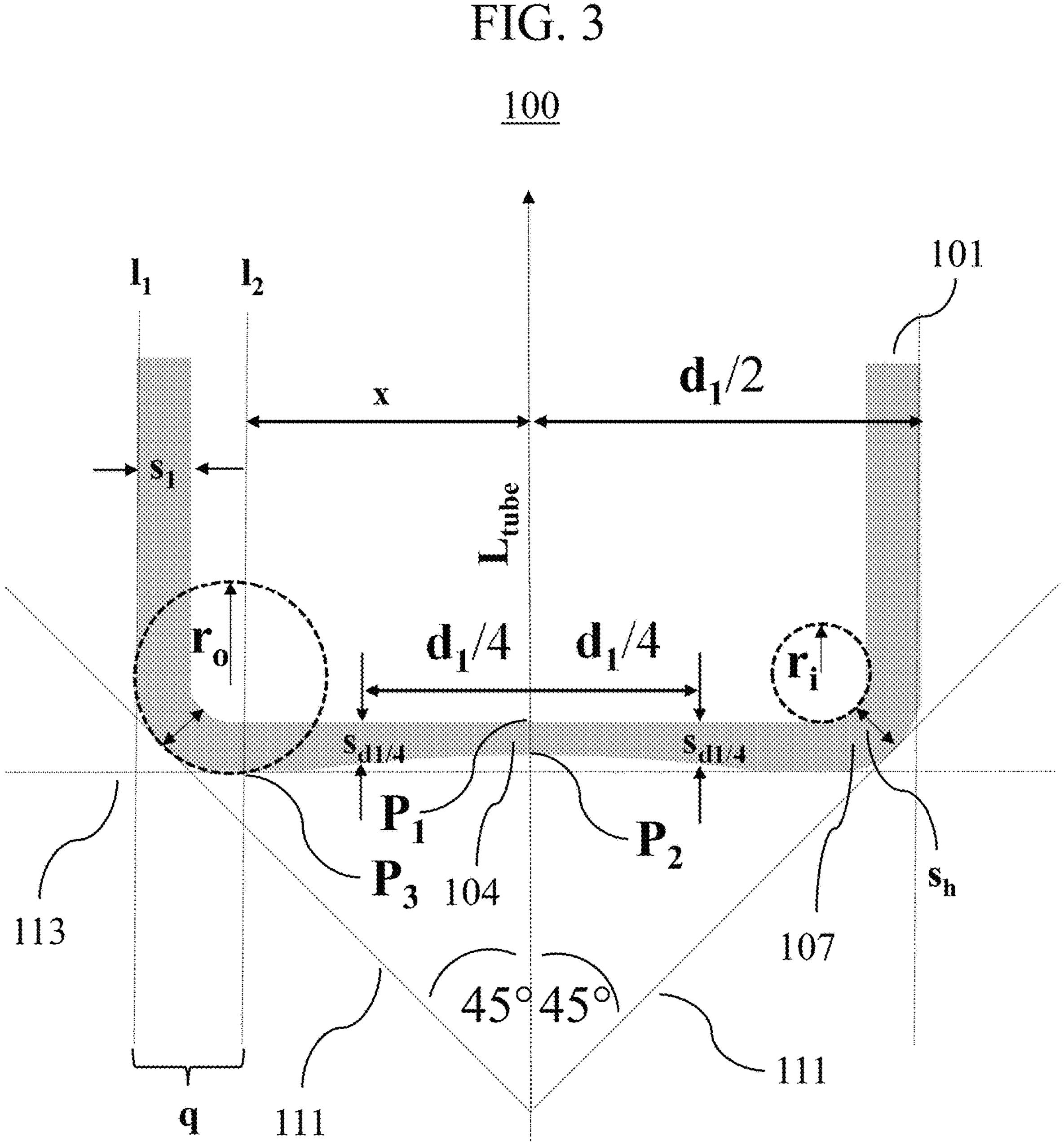
FIG. 3 illustrates a cross-sectional view of a glass container illustrating a glass bottom and a lower part of a glass tube that is connected to the glass bottom by a curved glass heel.

FIG. 3 shows a cross-sectional view of a glass container 100 illustrating the glass bottom 104 and the lower part of glass tube 101 that is connected to the glass bottom by the curved glass heel 107. For any cut surface 110 of the glass container 100 that is obtainable by cutting the glass container 100 in a plane that includes the longitudinal axis $L_{tube}$ (see FIGS. 2A and 2B) thickness $s_{min}$ is the minimum and thickness $s_{max}$ the maximum thickness of the circular glass bottom 104 determined at any position having the distance $d_1/4$ or less to longitudinal axis $L_{tube}$. Thickness $s_{d1/4}$ is the thickness of the glass bottom 104 determined at a position having the distance $d_1/4$ to longitudinal axis $L_{tube}$ (wherein $d_1$ is the outer diameter of the glass tube 101), distance $d_1/4$ being determined in a direction that is perpendicular to longitudinal axis $L_{tube}$ and thickness $s_{min}$, $s_{max}$ and $s_{d1/4}$ each being determined in a direction that is parallel to longitudinal axis $L_{tube}$. The glass container 100 provided according to the present invention is characterized in that the term $s_1 \times s_{d1/4}$ reaches a certain value, wherein the value for $s_1 \times s_{d1/4}$ depends on the size of the container, i.e., on the overflow capacity, the overflow capacity being the maximum volume of liquid that the glass container 100 can hold if filled to the point of overflowing.

According to an exemplary embodiment of the glass container 100 provided according to the present invention, for any cut surface 110 of the glass container 100 that is obtainable by cutting the glass container 100 in a plane that includes the longitudinal axis $L_{tube}$ (see FIGS. 2A and 2B) the curved glass heel 107 is defined by an outer radius $r_o$, an inner radius $r_i$ and a thickness of the glass $s_h$ determined at a position at which a tangent line 111 that includes an angle of 45° with longitudinal axis $L_{tube}$ touches the outer surface of the curved glass heel, thickness $s_h$ being determined in a direction perpendicular to that tangent line 111, wherein the minimum value for the term $s_1 \times r_i \times s_h \times s_{d1/4}$ also depends on the size of the glass container 100, i. e., on the overflow capacity.

According to a further exemplary embodiment of the glass container 100 provided according to the present invention, for any cut surface 110 of the glass container 100 that is obtainable by cutting the glass container 100 in a plane that includes the longitudinal axis $L_{tube}$ (see FIGS. 2A and 2B) q is the distance between a first line $l_1$ that runs parallel to longitudinal axis $L_{tube}$ and that touches the outer surface of the glass tube 100 and a second line $l_2$ that runs parallel to the first line $l_1$ and that passes through the glass bottom 104 at a point $P_3$ which has the largest distance to longitudinal axis $L_{tube}$ from all the points on the outer surface 106 of the glass bottom 104 that, when the glass container 100 is placed on a support 112, touches the support 112, wherein the minimum value for the term $(s_1 \times r_i \times s_h \times s_{d1/4})/q$ also depends on the size of the glass container 100, i. e., on the overflow capacity.

According to a further exemplary embodiment of the glass container 100 provided according to the present invention, for any cut surface of the glass container that is obtainable by cutting the glass container in a plane that includes the longitudinal axis $L_{tube}$, line $l_1$ is a first line that runs parallel to longitudinal axis $L_{tube}$ and that touches the outer surface of the glass tube and line $l_2$ is a second line that runs parallel to the first line $l_1$ and that passes through the glass bottom at a point $P_3$ which has the largest distance to longitudinal axis $L_{tube}$ from all the points on the outer surface of the glass bottom that, when the glass container is placed on a support, touches the support, and wherein the distance of point $P_3$ to longitudinal axis $L_{tube}$ is x, wherein $x>0.7\times d_1/2$.

FIG. 4A illustrates the determination of $s_h$ in a curved glass heel 107 in plane 110. For the determination of $s_h$ a tangent 111 that confines an angle of 45° with the ground-level bearing surface 113 is placed at the exterior surface of the curved glass heel 107. The point of the exterior surface of the curved glass heel 107 that comes into contact with the 45-tangent 111 is designated as "A" (see the lower circle in FIG. 4A). Next, a straight line 112 orthogonal to 45°-tangent 111 is guided through point "A". The position at which this straight orthogonal line 112 breaks through the interior side of the curved glass heel 107 is designated as "B" (see the upper circle FIG. 4A). $s_h$ corresponds to the distance between points "A" and "B".

Figure 4B:
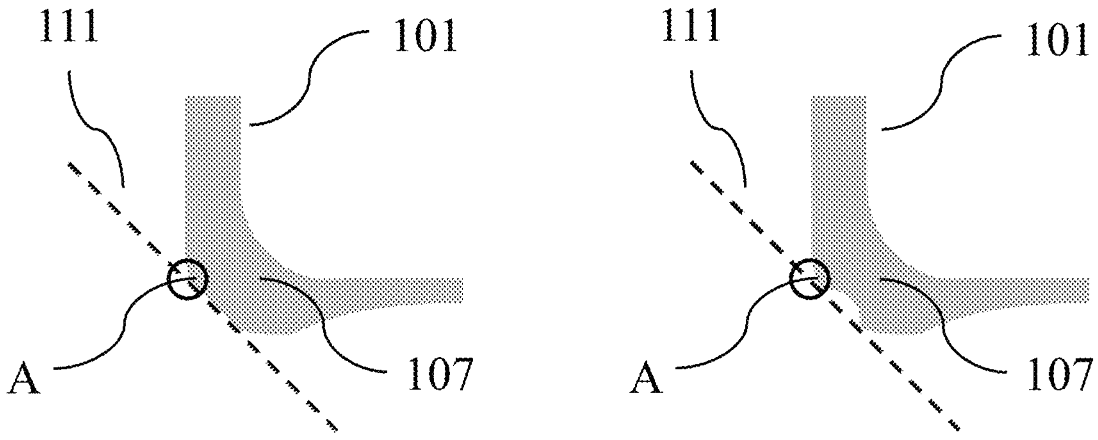
FIG. 4B illustrates different shapes of the exterior surface of a curved glass heel.

FIG. 4B shows curved glass heels 107 having a shape such that there are more than only one point of exterior surface of the curved glass heel 107 that comes into contact with the 45-tangent 111. In such a case point "A" corresponds to the point that is nearest to the outer surface of glass tube 101.

FIG. 5A illustrates the determination of $r_o$ in a curved glass heel 107 in plane 110. For the determination of $r_o$ the intersection point of a first straight $l_1$ that forms an elongation of the exterior side of the glass tube 101 and the ground-level bearing surface 113 is determined. This intersection point is designated as "C" (see the left circle in FIG. 5A). Next, the point of the exterior surface of the glass container 100 that contacts the ground-level bearing surface 113 and that is closest to point "C" is determined. This intersection point is designated as "D" (see the right circle in FIG. 5A). $r_o$ corresponds to the distance between points "C" and "D".

FIG. 5B illustrates the determination of $r_i$ in a curved glass heel 107 in plane 110. For the determination of $r_i$ a tangent 119 that confines and angle of 45° with the ground-level bearing surface 114 is placed at the interior surface of the curved glass heel 107. The point of the interior surface of the curved glass heel 107 that comes into contact with the 45-tangent 114 is designated as "E" (see the small circle in FIG. 5B). Next, the largest quarter circle 115 is determined that can be properly positioned on the inner contour of the curved glass heel 107, that comprises point "E" in the middle of the quarter circle and the ends of which do not extend into the mass of glass. $r_i$ corresponds to the radius of the largest quarter circle 115.

If there are more than only one point of interior surface of the curved glass heel 105 that comes into contact with the 45°-tangent 119, point "E" corresponds to the geometric center between points "P1" and "P2", wherein point "P1" is the point on the 45°-tangent 119 that comes into contact with the interior surface of the curved glass and that is located nearest to the glass tube 101 and point "P2" is the point on the 45°-tangent 119 that comes into contact with the interior surface of the curved glass heel 105 and that is located nearest to the glass bottom 104.

Figure 6:
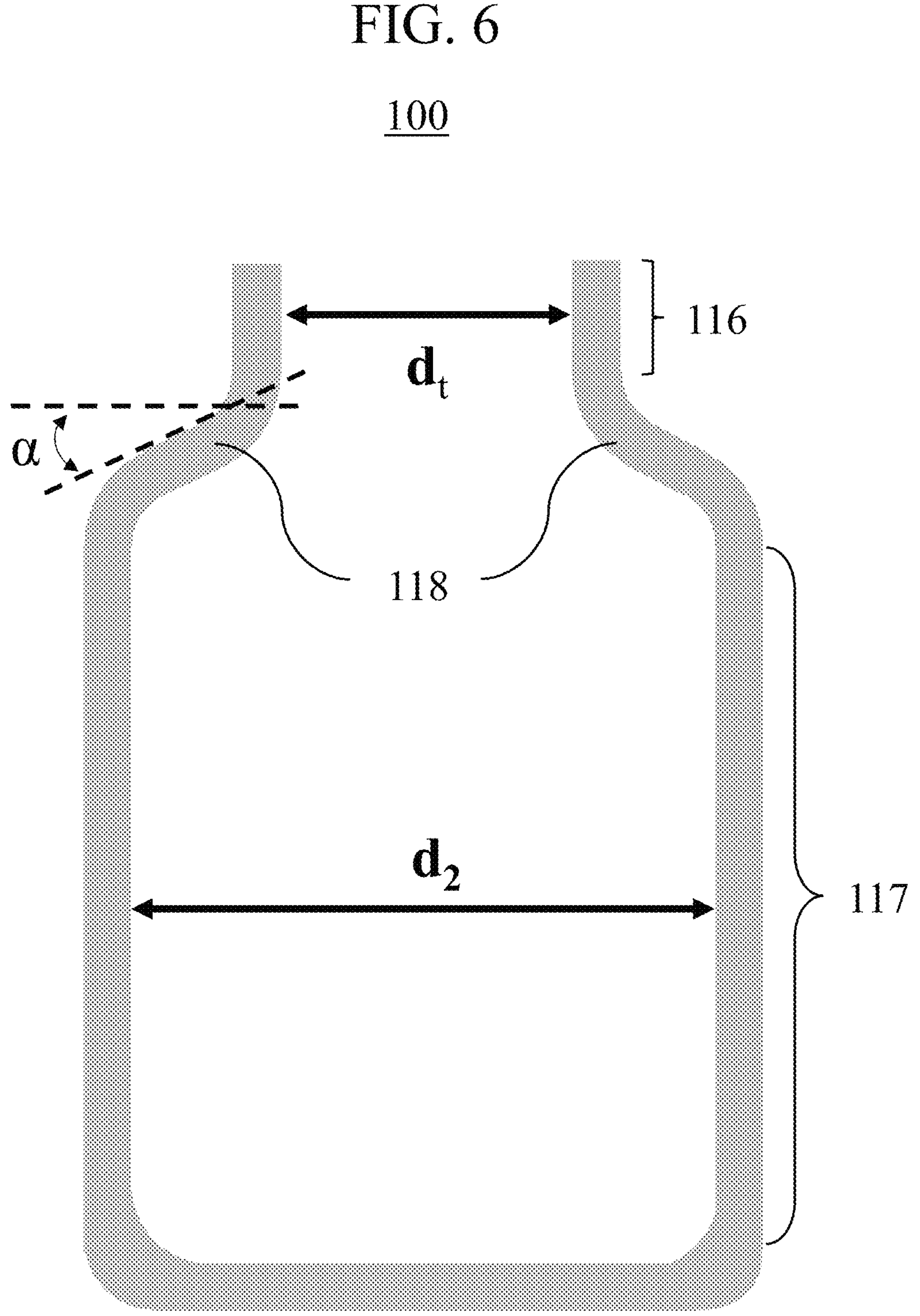
FIG. 6 illustrates a glass container provided according to the invention.

FIG. 6 shows a cross sectional view of a further glass container 100 provided according to the invention. The glass container 100 comprises a top region 116 in which the inner diameter is $d_t$ and a body region 117 in which the inner diameter of the glass tube 101 is $d_2$, wherein $d_2>d_t$. The glass container 100 further comprises a shoulder region 118 that connects the body region 117 with the top region 116, wherein the shoulder region 118 is characterized by a shoulder angle α. At the top of the non-closed glass container 100 that is shown in this FIG. is an opening.

Figures 7A, 7B, 7C:
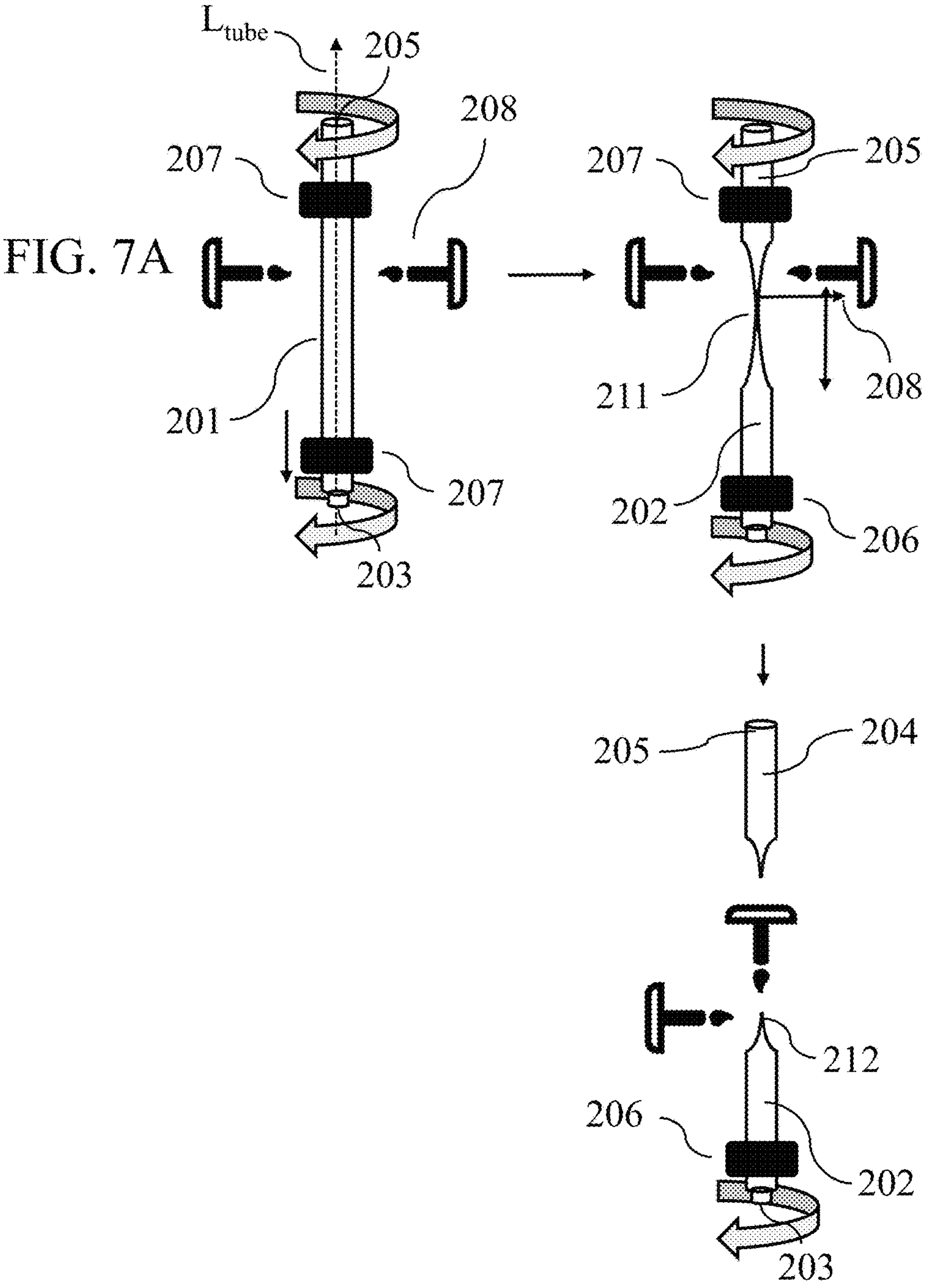
FIGS. 7A-C illustrate steps A), B) and C) of a process provided according to the invention for the preparation of a glass container.

FIG. 7 illustrates a process provided according to the invention for the preparation of a glass container 100. FIG. 7A illustrates process step A), B) and C), as they can be performed in a common glass processing machine. A glass tube 201 that comprises a first portion 202 with a first end 203, a second portion 204 with a second end 205 and a longitudinal axis $L_{tube}$ that passes through the center of the first and the second end (203,205) is loaded in a glass processing machine comprising a plurality of processing stations, first and second clamping chucks 206,207 which are adapted and arranged to hold the glass tube 201 while rotating the glass tube 201 around its longitudinal axis $L_{tube}$ and to transport the rotating glass tube 201 from one glass container processing station to the next one, a heating device 208 and a mold matrix 209. In process step B) of the process provided according to the present invention the glass tube 201 is heated at a defined position between the first portion 202 and the second portion 204 to a temperature above the glass transition temperature while the glass tube 201 is rotating around its longitudinal axis $L_{tube}$ (FIG. 7A) and the first portion 202 and the second portion 204 are pulled apart (FIG. 7B). In the process shown in FIGS. 7A-7C the first portion 202 and the second portion 204 are pulled apart by moving downwards the lower clamping chucks 206 while the glass tube 201 is rotating around its longitudinal axis $L_{tube}$. When moving downwards the lower clamping chucks 206 and thus also the lower portion 202 of the glass tube 201, a glass thread 212 is formed (see FIG. 7B). In process step C) the first portion 202 is separated from the second portion 204 and a closed bottom 210 is formed at one end 212 of the first portion 202 (FIG. 7C).

Figure 8A:
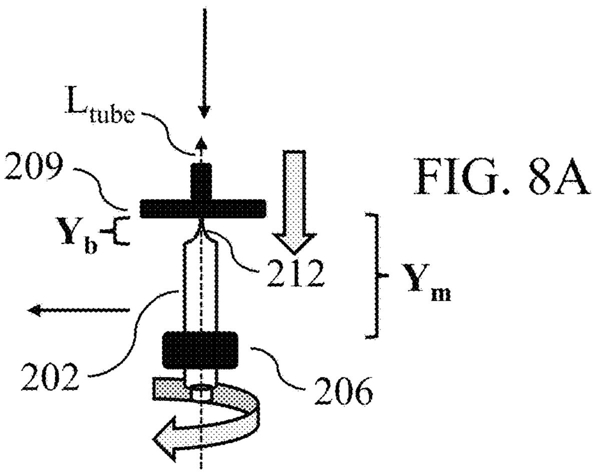
FIGS. 8A-C illustrate step D) of a process provided according to the invention for the preparation of a glass container.
Figure 8B:
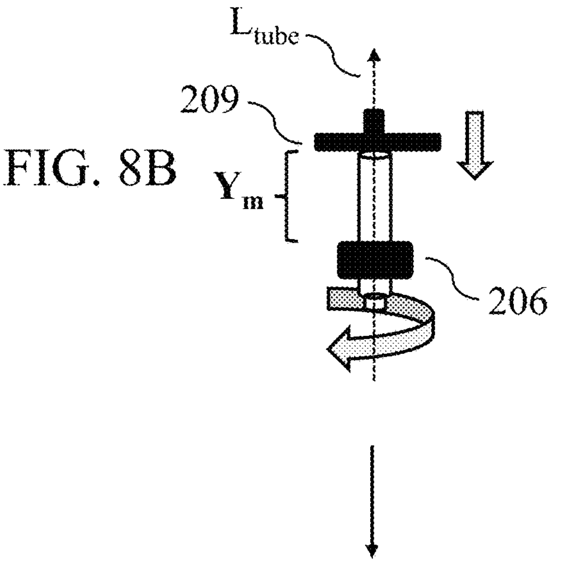
Figure 8C:
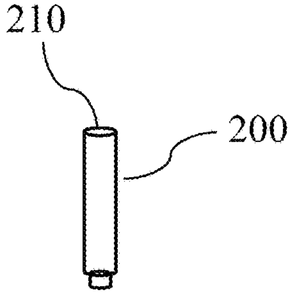

FIGS. 8A-C illustrate an exemplary embodiment of step D) of the process provided according to the present invention. As shown in that FIG., a mold matrix 209 is moved towards the closed bottom 210 and is brought into contact with the closed bottom 210 of the first portion 202. As shown in FIGS. 8A-C, the process provided according to the present invention is optionally characterized in that, while bringing the mold matrix 209 into contact with the closed bottom 210, a distance $Y_m$ between the mold matrix 209 and the first clamping chuck 206 is decreased stepwise, wherein—as shown by means of the dashed lines in FIG. 4—$Y_m$ is the shortest distance between the upper end of the first clamping chuck 206 and the bottom end of the mold matrix 209, i. e., the surface of the mold matrix 209 that comes into contact with the mass of molten glass at the closed bottom 210, wherein $Y_m$ is measured in a direction parallel to longitudinal axis $L_{tube}$. In the exemplary embodiment of the process provided according to the present invention as shown in FIGS. 7A to 8C, the first and second clamping chucks 206,207 are adapted and arranged to hold the glass tube 201 in a vertical position, wherein the second portion 204 of the glass tube 201 corresponds to the upper portion 204 of the glass tube 201 having an upper end 205 and the first portion 202 of the glass tube 201 corresponds to the lower portion 202 of the glass tube 201 having a lower end 203. Accordingly, the first clamping chucks 206 are arranged as lower clamping chucks 206 holding the lower portion 202 of the glass tube 201 and the second clamping chucks 207 are arranged as upper clamping chucks 207 holding the upper portion 205 of the glass tube 201, wherein the one end 212 is opposite of the lower end 203.

Figure 9A:
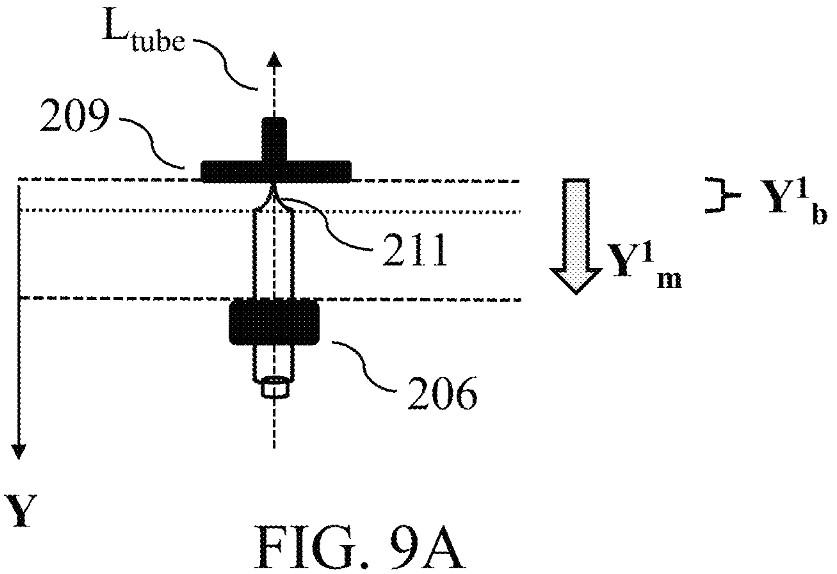
FIGS. 9A-9B illustrate in more detail the movement of a mold matrix relative to first clamping chucks in step D) of the process provided according to the present invention.
Figure 9B:
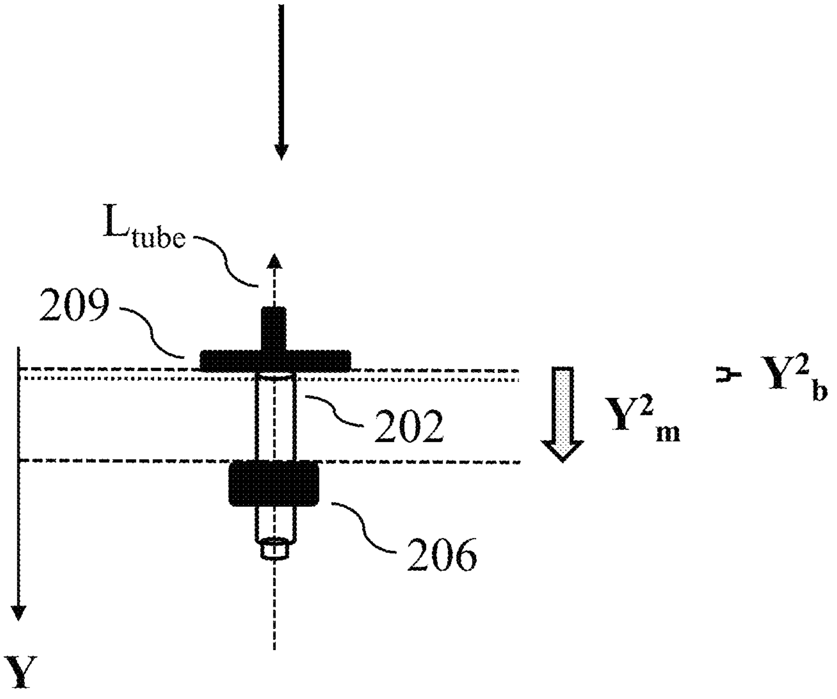

FIGS. 9A-9B show in more detail the movement of the mold matrix 209 relative to the first clamping chucks 206 in step D) of the process provided according to the present invention. As shown in that FIG., distance $Y_m$ between the mold matrix 209 and the first clamping chuck 206 is decreased in a first step (as shown in FIG. 9A) by a first distance $Y^1_m$ and a second step (as shown in FIG. 9B) by a second distance $Y^2_m$, optionally the first step and the second step are successive. As shown in FIGS. 9A and 9B, the first distance $Y^1_m$ is larger than the second distance $Y^2_m$, wherein the first distance $Y^1_m$ is 19 mm or less, and the second distance $Y^2_m$ is 1 mm or less. Optionally, there is a time delay $\Delta t$ between the first step shown in FIG. 9A and the second step shown in FIG. 9B, wherein $\Delta t$ optionally is 0.1 s or more.

As also shown in FIGS. 9A and 9B, the final distance defined by a gap $Y_b$ between the mold matrix 209 and closed bottom 210 is in the first step optionally defined by a first gap $Y^1_b$ and in the second step optionally defined by a second gap $Y^2_b$, wherein it is also exemplary that the first gap $Y^1_b$ is larger than the second gap $Y^2_b$. It is also exemplary that the first gap $Y^1_b$ is 8 mm or less and that the second gap $Y^2_b$ is 2 mm or less.

FIG. 10 shows a flow chart of a process 300 provided according to the invention for packaging a pharmaceutical composition. In a process step a) 301, the glass container 100 provided according to the present invention is provided. In a process step b) 302, a liquid pharmaceutical composition is inserted into the glass container 100, wherein the liquid pharmaceutical composition optionally comprises water in an amount of at least 50 wt.-%, based on the total weight of the liquid pharmaceutical composition, and wherein the liquid pharmaceutical composition further comprises sucrose. In process step c) 303 the liquid pharmaceutical composition contained in the glass container 100 is frozen.

Figure 11:
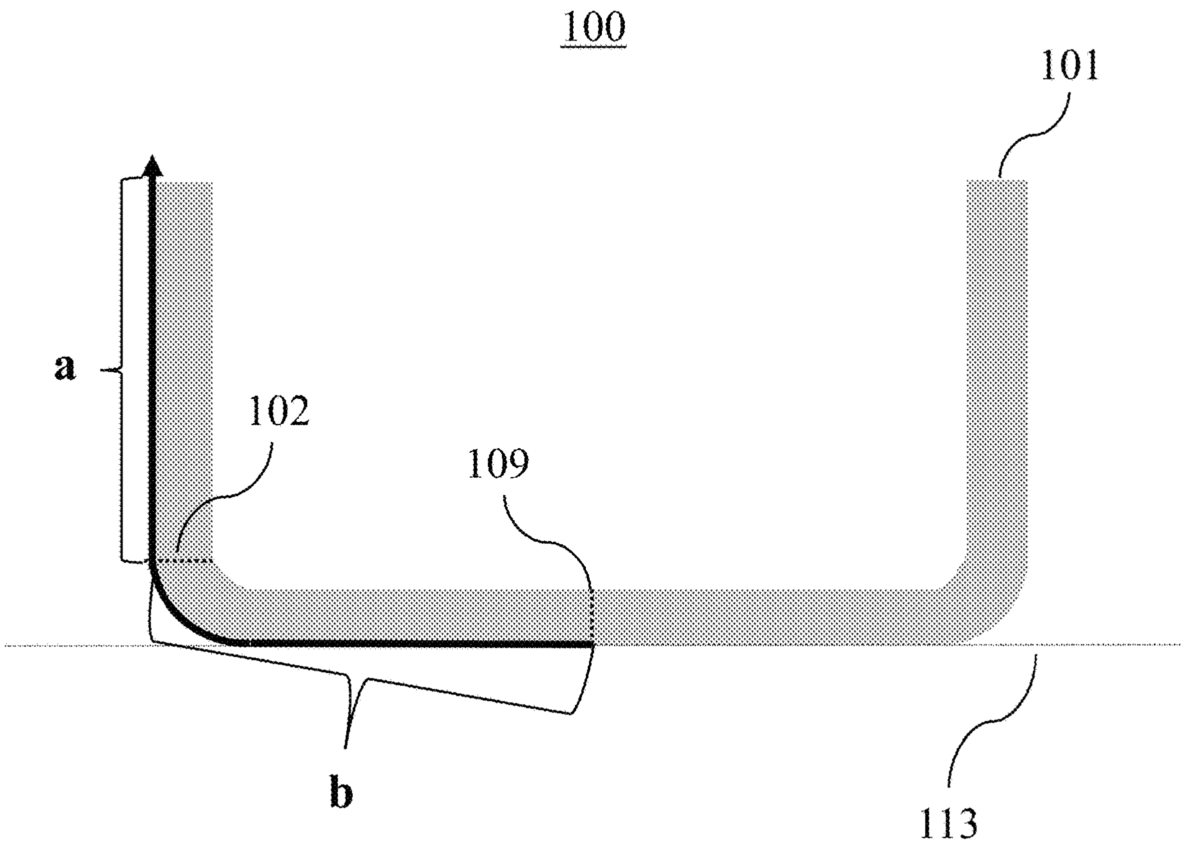
FIG. 11 illustrates a position s of a given point on the outer surface of a glass container defining the x-axis in the graphs shown in FIGS. 12 and 13.

FIG. 11 shows the position s of a given point on the outer surface of a glass container defining the x-axis in the graphs shown in FIGS. 12 and 13, these FIGS. Showing the maximum principal stress max{σout} versus the path position s for a glass vial according to the prior art (FIG. 12) and for a glass vial provided according to the present invention (FIG. 13). For details, reference is made to the comments in the experimental section.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

100 glass container provided according to the invention
101 glass tube
102 first end of the glass tube 101
103 further end of the glass tube 101
104 glass bottom
105 inner surface of glass bottom 104
106 outer surface of glass bottom 104
107 curved glass heel
108 an outer region of the glass bottom 104
109 center of glass bottom 104
110 cross-sectional plane in the middle of the glass container 100
111 45°-tangent at the exterior surface of the curved glass heel 107
112 straight line orthogonal to 45°-tangent 111
113 ground-level bearing surface
114 45°-tangent at the interior surface of the curved glass heel 107
115 largest quarter circle
116 top region of container 100
117 body region of container 100
118 should region of container 100
200 glass container
201 glass tube
202 first or lower portion of the glass tube 201
203 first or lower end of the first or lower portion 202
204 second or upper portion of the glass tube 201
205 second or upper end of the second or upper portion 204
206 first or lower clamping chucks
207 second or upper clamping chucks
208 heating device, optionally a separation gas burner
209 mold matrix
210 closed bottom
211 glass thread
212 one end of the first or lower end of the first or lower portion 202
300 Process provided according to the invention for packaging a pharmaceutical composition
301 process step a)
302 process step b)
303 process step c)

What is claimed is:

1. A glass container, comprising:

i) a glass tube with a first end, a further end, an outer diameter ($d_1$) and a glass thickness ($s_1$);

ii) a glass bottom closing the glass tube at the first end and comprising an inner surface directed to an inside of the glass container and an outer surface directed to an outside of the glass container; and iii) a curved glass heel extending from an outer end of the glass bottom to the first end of the glass tube;

wherein the glass container is characterized by a longitudinal axis ($L_{tube}$) that passes through a center of the glass bottom;

wherein for any cut surface of the glass container that is obtainable by cutting the glass container in a plane that includes the longitudinal axis $L_{tube}$ a minimum thickness ($s_{min}$) and a maximum thickness ($s_{max}$) of the glass bottom determined at any position having a distance $d_1/4$ or less to longitudinal axis $L_{tube}$ and a thickness ($s_{d1}/4$) is the thickness of the glass bottom determined at a position having the distance $d_1/4$ to the longitudinal axis $L_{tube}$, the distance to the longitudinal axis $L_{tube}$ in each case being determined in a direction that is perpendicular to the longitudinal axis $L_{tube}$ and thicknesses $s_{min}$, $s_{max}$ and $s_{d1}/4$ being determined in a direction that is parallel to longitudinal axis $L_{tube}$, wherein $s_{max}/s_{min}$ is less than 1.8;

wherein the glass container has an overflow capacity of not more than 9 ml, wherein the overflow capacity is a maximum volume of liquid that the glass container can hold if filled to the point of overflowing;

and wherein the following conditions are fulfilled:

$s_1 \times s_{d1}/4$ is in a range from 1.1 to 2.5 $mm^2$ and $s_{d1}/4$ is in a range from 1.1 to 1.4 mm.

2. The glass container of claim 1, wherein for any cut surface of the glass container that is obtainable by cutting the glass container in a plane that includes the longitudinal axis $L_{tube}$ the curved glass heel is defined by an outer radius ($r_o$), an inner radius ($r_i$) and a thickness of the glass ($s_h$) determined at a position at which a tangent line that includes an angle of 45° with the longitudinal axis $L_{tube}$ touches the outer surface of the curved glass heel, the thickness $s_h$ being determined in a direction perpendicular to the tangent line;

wherein the following condition is fulfilled:

$s_1 \times r_i \times s_h \times s_{d1}/4$ is in a range from 0.6 to 2.5 $mm^4$.

3. The glass container of claim 2, wherein for any cut surface of the glass container that is obtainable by cutting the glass container in a plane that includes the longitudinal axis $L_{tube}$ q is a distance between a first line $l_1$ that runs parallel to longitudinal axis $L_{tube}$ and that touches the outer surface of the glass tube and a second line $l_2$ that runs parallel to the first line $l_1$ and that passes through the glass bottom at a point $P_3$ which has a largest distance to the longitudinal axis $L_{tube}$ from all the points on the outer surface of the glass bottom that, when the glass container is placed on a support, touches the support;

wherein the following condition is fulfilled:

$(s_1 \times r_i \times s_h \times s_{d1}/4)/q$ is in a range from 0.32 to 1.5 $mm^3$.

4. The glass container of claim 3, wherein for any cut surface of the glass container that is obtainable by cutting the glass container in a plane that includes the longitudinal axis $L_{tube}$, line $l_1$ is a first line that runs parallel to the longitudinal axis $L_{tube}$ and that touches the outer surface of the glass tube and line $l_2$ is a second line that runs parallel to the first line $l_1$ and that passes through the glass bottom at a point $P_3$ which has the largest distance to longitudinal axis $L_{tube}$ from all the points on the outer surface of the glass bottom that, when the glass container is placed on a support, touches the support, and wherein the distance of point $P_3$ to the longitudinal axis $L_{tube}$ is x, wherein the following condition is fulfilled: $x > 0.7 \times d_1/2$.

5. The glass container of claim 4, wherein $x > 0.76 \times d_1/2$.

6. The glass container of claim 3, wherein the following condition is fulfilled:

$(s_1 \times r_i \times s_h \times s_{d1}/4)/q$ is in a range from 0.36 to 0.8 $mm^3$.

7. The glass container of claim 2, wherein the following condition is fulfilled: $s_h^3/(r_o \times s_1) > 0.8$ mm.

8. The glass container of claim 7, wherein $s_h^3/(r_o \times s_1) > 1.5$ mm.

9. The glass container of claim 2, wherein the following condition is fulfilled: $r_i > 0.6$ mm.

10. The glass container of claim 9, wherein $r_i$ is in a range from 0.65 to 0.85 mm.

11. The glass container of claim 2, wherein the following condition is fulfilled: $r_i + s_h - r_o > 0$ mm.

12. The glass container of claim 11, wherein $r_i + s_h - r_o > 0.5$ mm.

13. The glass container of claim 2, wherein the following condition is fulfilled: $s_h > 1.05 \times s_1$.

14. The glass container of claim 13, wherein $s_h > 1.4 \times s_1$.

15. The glass container of claim 1, wherein the glass tube is a cylindrical glass tube and the glass bottom is a circular glass bottom.

16. The glass container of claim 1, wherein the glass container comprises a glass of a type selected from the group consisting of a borosilicate glass, an aluminosilicate glass, soda lime glass and fused silica.

17. The glass container of claim 1, wherein an interior volume of the glass container comprises a pharmaceutical composition.

18. The glass container of claim 17, wherein the pharmaceutical composition comprises a sugar, a salt, or a mixture thereof.

19. The glass container of claim 17, wherein the pharmaceutical composition comprises an mRNA-vaccine.

20. The glass container of claim 17, wherein the pharmaceutical composition is frozen or freeze-dried.

* * * * *